(12) United States Patent
Ariff et al.

(10) Patent No.: US 8,738,532 B2
(45) Date of Patent: May 27, 2014

(54) SYSTEM AND METHOD FOR SECURING DATA THROUGH A PDA PORTAL

(75) Inventors: Fauziah B. Ariff, London (GB); Fred Bishop, Glendale, AZ (US); Trey Neemann, Glendale, AZ (US); Theodore S. Voltmer, Caldwell, NJ (US)

(73) Assignee: Propulsion Remote Holdings, LLC, Dover, DE (US)

( * ) Notice: Subject to any disclaimer, the term of this patent is extended or adjusted under 35 U.S.C. 154(b) by 290 days.

(21) Appl. No.: 13/181,883

(22) Filed: Jul. 13, 2011

(65) Prior Publication Data

US 2011/0271098 A1    Nov. 3, 2011

Related U.S. Application Data

(60) Continuation of application No. 12/332,248, filed on Dec. 10, 2008, now Pat. No. 7,996,320, which is a (Continued)

(51) Int. Cl.

| | |
|---|---|
| *G06Q 30/02* | (2012.01) |
| *G06F 15/16* | (2006.01) |
| *H04L 29/06* | (2006.01) |
| *G06F 17/30* | (2006.01) |
| *G06F 7/04* | (2006.01) |
| *G06Q 20/20* | (2012.01) |
| *G06Q 20/32* | (2012.01) |
| *G06Q 20/38* | (2012.01) |
| *G06Q 30/06* | (2012.01) |
| *G06Q 40/02* | (2012.01) |

(52) U.S. Cl.
CPC ............ *G06Q 20/20* (2013.01); *G06Q 20/32* (2013.01); *G06Q 20/322* (2013.01); *G06Q 20/387* (2013.01); *G06Q 30/02* (2013.01); *G06Q 30/0226* (2013.01); *G06Q 30/06* (2013.01); *G06Q 40/02* (2013.01)
USPC ............... 705/50; 713/153; 709/203; 726/5

(58) Field of Classification Search
CPC ..... G06Q 20/10; G06Q 20/32; G06Q 20/322; G06Q 20/387; G06Q 30/02; G06Q 30/06; G06Q 30/0226; G06Q 40/02; G06F 21/606; G06F 21/6245; H04L 63/04815; H04L 63/0464
USPC .................. 705/51; 713/168; 709/203; 726/5
See application file for complete search history.

(56) References Cited

U.S. PATENT DOCUMENTS

| 4,087,660 A | 5/1978 | Sedley |
|---|---|---|
| 4,358,672 A | 11/1982 | Hyatt et al. |

(Continued)

FOREIGN PATENT DOCUMENTS

| EP | 0308224 | 3/1989 | |
|---|---|---|---|
| EP | 1053525 B1 | * 12/2009 | .............. G06F 17/00 |

(Continued)

OTHER PUBLICATIONS

Wireless Application Forum, Ltd. 1998; "WAP WTLS: Version Apr. 30, 1998; Wireless Application Protocol Wireless Transport Layer Security Specification"; Apr. 30, 1998; pp. 1-85.*

(Continued)

*Primary Examiner* — Ella Colbert

(57) ABSTRACT

Consumers may utilize computing devices to assist in the purchase and/or loyalty process, and in particular, the consumer may utilize a PDA to facilitate the purchase and/or loyalty process. During the purchase and/or loyalty process, the consumer may need to insure that any content downloaded or used in association with the PDA is secure in how it is collected, assembled, and delivered to the PDA device. This system and method secures the data from its source to when it is actually viewed or used by the authorized user. The exemplary system and method may establish a PDA portal link to the web site for collecting specified information for a user and transmitting the information to the remote device. To receive the information, the PDA contacts the portal and establishes a connection, authenticates itself to the network and allows the user to complete secured transactions or transmissions over the network.

20 Claims, 11 Drawing Sheets

Related U.S. Application Data division of application No. 11/276,800, filed on Mar. 15, 2006, now Pat. No. 7,584,149, which is a division of application No. 10/084,744, filed on Feb. 26, 2002, now Pat. No. 7,222,101, which is a continuation-in-part of application No. 09/836,213, filed on Apr. 17, 2001, now Pat. No. 7,398,225.

(60) Provisional application No. 60/271,457, filed on Feb. 26, 2001, provisional application No. 60/279,817, filed on Mar. 29, 2001.

(56) References Cited

U.S. PATENT DOCUMENTS

| | | |
|---|---|---|
| 4,473,825 A | 9/1984 | Walton |
| 4,546,241 A | 10/1985 | Walton |
| 4,609,812 A | 9/1986 | Drexler |
| 4,634,848 A | 1/1987 | Shinohara et al. |
| 4,910,672 A | 3/1990 | Off et al. |
| 5,025,372 A | 6/1991 | Burton et al. |
| 5,056,019 A | 10/1991 | Schultz et al. |
| 5,117,355 A | 5/1992 | McCarthy |
| 5,128,752 A | 7/1992 | Von Kohorn |
| 5,173,851 A | 12/1992 | Off et al. |
| 5,200,889 A | 4/1993 | Mori |
| 5,201,010 A | 4/1993 | Deaton et al. |
| 5,202,826 A | 4/1993 | McCarthy |
| 5,233,514 A | 8/1993 | Ayyoubi et al. |
| 5,237,620 A | 8/1993 | Deaton et al. |
| 5,256,863 A | 10/1993 | Ferguson et al. |
| 5,287,268 A | 2/1994 | McCarthy |
| 5,305,196 A | 4/1994 | Deaton et al. |
| 5,327,508 A | 7/1994 | Deaton et al. |
| 5,353,218 A | 10/1994 | De Lapa et al. |
| 5,382,779 A | 1/1995 | Gupta |
| 5,388,165 A | 2/1995 | Deaton et al. |
| 5,424,524 A | 6/1995 | Ruppert et al. |
| 5,430,644 A | 7/1995 | Deaton et al. |
| 5,434,394 A | 7/1995 | Roach et al. |
| 5,448,471 A | 9/1995 | Deaton et al. |
| 5,467,269 A | 11/1995 | Flaten |
| 5,471,669 A | 11/1995 | Lidman |
| 5,477,038 A | 12/1995 | Levine et al. |
| 5,483,444 A | 1/1996 | Heintzeman et al. |
| 5,491,326 A | 2/1996 | Marceau et al. |
| 5,502,636 A | 3/1996 | Clarke |
| 5,513,102 A | 4/1996 | Auriemma |
| 5,535,407 A | 7/1996 | Yanagawa et al. |
| 5,537,314 A | 7/1996 | Kanter |
| 5,559,313 A | 9/1996 | Claus et al. |
| 5,592,560 A | 1/1997 | Deaton et al. |
| 5,612,868 A | 3/1997 | Off et al. |
| 5,621,812 A | 4/1997 | Deaton et al. |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,115 A | 7/1997 | Schrader et al. |
| 5,659,469 A | 8/1997 | Deaton et al. |
| 5,673,322 A | 9/1997 | Pepe et al. |
| 5,675,662 A | 10/1997 | Deaton et al. |
| 5,677,952 A | 10/1997 | Blakley, III et al. |
| 5,687,322 A | 11/1997 | Deaton et al. |
| 5,689,100 A | 11/1997 | Carrithers et al. |
| 5,708,782 A | 1/1998 | Larson et al. |
| 5,710,886 A | 1/1998 | Christensen et al. |
| 5,715,399 A | 2/1998 | Bezos |
| 5,729,693 A | 3/1998 | Holda-Fleck |
| 5,734,838 A | 3/1998 | Robinson et al. |
| 5,742,845 A | 4/1998 | Wagner |
| 5,749,075 A | 5/1998 | Toader et al. |
| 5,761,648 A | 6/1998 | Golden et al. |
| 5,765,141 A | 6/1998 | Spector |
| 5,774,868 A | 6/1998 | Cragun et al. |
| 5,774,869 A | 6/1998 | Toader |
| 5,774,870 A | 6/1998 | Storey |
| 5,794,230 A | 8/1998 | Horadan et al. |
| 5,802,275 A | 9/1998 | Blonder |
| 5,806,043 A | 9/1998 | Toader |
| 5,806,044 A | 9/1998 | Powell |
| 5,806,045 A | 9/1998 | Biorge et al. |
| 5,814,796 A | 9/1998 | Benson et al. |
| 5,816,918 A | 10/1998 | Kelly et al. |
| 5,822,230 A | 10/1998 | Kikinis et al. |
| 5,832,457 A | 11/1998 | O'Brien et al. |
| 5,832,458 A | 11/1998 | Jones |
| 5,834,748 A | 11/1998 | Litman |
| 5,839,117 A | 11/1998 | Cameron et al. |
| 5,844,230 A | 12/1998 | Lalonde |
| 5,845,259 A | 12/1998 | West et al. |
| 5,848,399 A | 12/1998 | Burke |
| 5,855,007 A | 12/1998 | Jovicic et al. |
| 5,857,175 A | 1/1999 | Day et al. |
| 5,864,822 A | 1/1999 | Baker, III |
| RE36,116 E | 2/1999 | McCarthy |
| 5,870,722 A | 2/1999 | Albert et al. |
| 5,872,915 A * | 2/1999 | Dykes et al. ............ 726/5 |
| 5,884,277 A | 3/1999 | Khosla |
| 5,892,827 A | 4/1999 | Beach et al. |
| 5,892,900 A | 4/1999 | Ginter et al. |
| 5,892,905 A | 4/1999 | Brandt et al. |
| 5,898,838 A | 4/1999 | Wagner |
| 5,903,874 A | 5/1999 | Leonard et al. |
| 5,903,880 A | 5/1999 | Biffar |
| 5,905,246 A | 5/1999 | Fajkowski |
| 5,905,908 A | 5/1999 | Wagner |
| 5,907,830 A | 5/1999 | Engel et al. |
| 5,907,831 A | 5/1999 | Lotvin et al. |
| 5,909,023 A | 6/1999 | Ono et al. |
| 5,913,210 A | 6/1999 | Call |
| 5,915,007 A | 6/1999 | Klapka |
| 5,915,019 A | 6/1999 | Ginter et al. |
| 5,915,243 A | 6/1999 | Smolen |
| 5,915,244 A | 6/1999 | Jack et al. |
| 5,918,211 A | 6/1999 | Sloane |
| 5,918,213 A | 6/1999 | Bernard et al. |
| 5,918,214 A | 6/1999 | Perkowski |
| 5,920,847 A | 7/1999 | Kolling et al. |
| 5,923,016 A | 7/1999 | Fredregill et al. |
| 5,933,811 A | 8/1999 | Angles et al. |
| 5,937,391 A | 8/1999 | Ikeda et al. |
| 5,937,394 A | 8/1999 | Wong et al. |
| 5,938,727 A | 8/1999 | Ikeda |
| 5,940,506 A | 8/1999 | Chang et al. |
| 5,950,173 A | 9/1999 | Perkowski |
| 5,952,638 A | 9/1999 | Demers et al. |
| 5,953,005 A | 9/1999 | Liu |
| 5,956,695 A | 9/1999 | Carrithers et al. |
| 5,956,700 A | 9/1999 | Landry |
| 5,964,830 A | 10/1999 | Durrett |
| 5,970,469 A | 10/1999 | Scroggie et al. |
| 5,971,277 A | 10/1999 | Cragun et al. |
| 5,974,398 A | 10/1999 | Hanson et al. |
| 5,978,777 A | 11/1999 | Garnier |
| 5,979,757 A | 11/1999 | Tracy et al. |
| 5,982,520 A | 11/1999 | Weiser et al. |
| 5,983,196 A | 11/1999 | Wendkos |
| 5,983,205 A | 11/1999 | Brams et al. |
| 5,984,191 A | 11/1999 | Chapin, Jr. |
| 5,988,500 A | 11/1999 | Litman |
| 5,991,376 A | 11/1999 | Hennessy et al. |
| 5,991,736 A | 11/1999 | Ferguson et al. |
| 5,992,738 A | 11/1999 | Matsumoto et al. |
| 5,992,752 A | 11/1999 | Wilz, Sr. et al. |
| 5,995,942 A | 11/1999 | Smith et al. |
| 5,999,914 A | 12/1999 | Blinn et al. |
| 6,000,608 A | 12/1999 | Dorf |
| 6,002,771 A | 12/1999 | Nielsen |
| 6,003,013 A | 12/1999 | Boushy et al. |
| 6,007,426 A | 12/1999 | Kelly et al. |
| 6,009,411 A | 12/1999 | Kepecs |
| 6,009,412 A | 12/1999 | Storey |
| 6,012,038 A | 1/2000 | Powell |

(56) References Cited

U.S. PATENT DOCUMENTS

| | | | |
|---|---|---|---|
| 6,012,039 A | 1/2000 | Hoffman et al. | |
| 6,012,051 A | 1/2000 | Sammon, Jr. et al. | |
| 6,012,636 A | 1/2000 | Smith | |
| 6,014,634 A | 1/2000 | Scroggie et al. | |
| 6,014,635 A | 1/2000 | Harris et al. | |
| 6,015,344 A | 1/2000 | Kelly et al. | |
| 6,016,476 A | 1/2000 | Maes et al. | |
| 6,018,695 A | 1/2000 | Ahrens et al. | |
| 6,018,718 A | 1/2000 | Walker et al. | |
| 6,018,724 A | 1/2000 | Arent | |
| 6,021,399 A | 2/2000 | Demers et al. | |
| 6,024,640 A | 2/2000 | Walker et al. | |
| 6,026,370 A | 2/2000 | Jermyn | |
| 6,026,375 A | 2/2000 | Hall et al. | |
| 6,026,377 A | 2/2000 | Burke | |
| 6,032,133 A | 2/2000 | Hilt et al. | |
| 6,032,136 A | 2/2000 | Brake, Jr. et al. | |
| 6,035,280 A | 3/2000 | Christensen | |
| 6,035,281 A | 3/2000 | Crosskey et al. | |
| 6,038,321 A | 3/2000 | Torigai et al. | |
| 6,039,244 A | 3/2000 | Finsterwald | |
| 6,041,308 A | 3/2000 | Walker et al. | |
| 6,044,360 A | 3/2000 | Picciallo | |
| 6,047,269 A | 4/2000 | Biffar | |
| 6,049,778 A | 4/2000 | Walker et al. | |
| 6,049,779 A | 4/2000 | Berkson | |
| 6,055,573 A | 4/2000 | Gardenswartz et al. | |
| 6,058,371 A | 5/2000 | Djian | |
| 6,058,482 A | 5/2000 | Liu | |
| 6,061,660 A | 5/2000 | Eggleston et al. | |
| 6,064,979 A | 5/2000 | Perkowski | |
| 6,065,120 A | 5/2000 | Laursen et al. | |
| 6,072,468 A | 6/2000 | Hocker et al. | |
| 6,073,840 A | 6/2000 | Marion | |
| 6,075,863 A | 6/2000 | Krishnan et al. | |
| 6,076,101 A | 6/2000 | Kamakura et al. | |
| 6,078,898 A | 6/2000 | Davis et al. | |
| 6,081,900 A | 6/2000 | Subramaniam et al. | |
| 6,088,730 A | 7/2000 | Kato et al. | |
| 6,092,069 A | 7/2000 | Johnson et al. | |
| 6,092,191 A * | 7/2000 | Shimbo et al. | 713/153 |
| 6,092,201 A | 7/2000 | Turnbull et al. | |
| 6,094,486 A * | 7/2000 | Marchant | 380/52 |
| 6,101,483 A | 8/2000 | Petrovich et al. | |
| 6,101,484 A | 8/2000 | Halbert et al. | |
| 6,101,485 A | 8/2000 | Fortenberry et al. | |
| 6,105,001 A | 8/2000 | Masi et al. | |
| 6,105,865 A | 8/2000 | Hardesty | |
| 6,115,737 A | 9/2000 | Ely et al. | |
| 6,119,230 A | 9/2000 | Carter | |
| 6,128,599 A | 10/2000 | Walker et al. | |
| 6,128,603 A | 10/2000 | Dent et al. | |
| 6,129,274 A | 10/2000 | Suzuki | |
| 6,131,810 A | 10/2000 | Weiss et al. | |
| 6,134,318 A | 10/2000 | O'Neil | |
| 6,134,548 A | 10/2000 | Gottsman et al. | |
| 6,138,911 A | 10/2000 | Fredregill et al. | |
| 6,141,161 A | 10/2000 | Sato et al. | |
| 6,145,739 A | 11/2000 | Bertina et al. | |
| 6,148,405 A * | 11/2000 | Liao et al. | 726/2 |
| 6,154,214 A | 11/2000 | Uyehara et al. | |
| 6,161,096 A | 12/2000 | Bell | |
| 6,164,533 A | 12/2000 | Barton | |
| 6,167,513 A * | 12/2000 | Inoue et al. | 713/150 |
| 6,173,267 B1 | 1/2001 | Cairns | |
| 6,178,407 B1 | 1/2001 | Lotvin et al. | |
| 6,178,408 B1 | 1/2001 | Copple et al. | |
| 6,182,894 B1 | 2/2001 | Hackett et al. | |
| 6,185,541 B1 | 2/2001 | Scroggie et al. | |
| 6,189,103 B1 | 2/2001 | Nevarez et al. | |
| 6,195,677 B1 | 2/2001 | Utsumi | |
| 6,196,458 B1 | 3/2001 | Walker et al. | |
| 6,199,099 B1 | 3/2001 | Gershman et al. | |
| 6,216,129 B1 | 4/2001 | Eldering | |
| 6,222,914 B1 | 4/2001 | McMullin | |
| 6,236,978 B1 | 5/2001 | Tuzhilin | |
| 6,243,688 B1 | 6/2001 | Kalina | |
| 6,249,772 B1 | 6/2001 | Walker et al. | |
| 6,249,773 B1 | 6/2001 | Allard et al. | |
| 6,251,017 B1 | 6/2001 | Leason et al. | |
| 6,267,672 B1 | 7/2001 | Vance | |
| 6,289,322 B1 | 9/2001 | Kitchen et al. | |
| 6,292,786 B1 | 9/2001 | Deaton et al. | |
| 6,298,335 B1 | 10/2001 | Bernstein | |
| 6,332,126 B1 | 12/2001 | Peirce et al. | |
| 6,332,157 B1 | 12/2001 | Mighdoll et al. | |
| 6,334,111 B1 | 12/2001 | Carrott | |
| 6,336,098 B1 | 1/2002 | Fortenberry et al. | |
| 6,363,362 B1 | 3/2002 | Burfield et al. | |
| 6,386,444 B1 | 5/2002 | Sullivan | |
| 6,401,085 B1 * | 6/2002 | Gershman et al. | 1/1 |
| 6,402,029 B1 | 6/2002 | Gangi | |
| 6,408,284 B1 | 6/2002 | Hilt et al. | |
| 6,438,527 B1 | 8/2002 | Powar | |
| 6,450,407 B1 | 9/2002 | Freeman et al. | |
| 6,452,498 B2 | 9/2002 | Stewart | |
| 6,484,147 B1 | 11/2002 | Brizendine et al. | |
| 6,484,940 B1 | 11/2002 | Dilday et al. | |
| 6,486,768 B1 | 11/2002 | French et al. | |
| 6,493,758 B1 * | 12/2002 | McLain | 709/227 |
| 6,510,998 B1 | 1/2003 | Stanford et al. | |
| 6,522,889 B1 | 2/2003 | Aarnio | |
| 6,532,448 B1 | 3/2003 | Higginson et al. | |
| 6,578,015 B1 | 6/2003 | Haseltine et al. | |
| 6,594,640 B1 | 7/2003 | Postrel | |
| 6,609,150 B2 | 8/2003 | Lee et al. | |
| 6,622,174 B1 * | 9/2003 | Ukita et al. | 709/246 |
| 6,629,143 B1 * | 9/2003 | Pang | 709/226 |
| 6,631,358 B1 | 10/2003 | Ogilvie | |
| 6,631,849 B2 | 10/2003 | Blossom | |
| 6,687,679 B1 | 2/2004 | Van Luchene et al. | |
| 6,721,743 B1 | 4/2004 | Sakakibara | |
| 6,748,365 B1 | 6/2004 | Quinlan et al. | |
| 6,820,061 B2 | 11/2004 | Postrel | |
| 6,826,594 B1 | 11/2004 | Pettersen | |
| 6,829,586 B2 | 12/2004 | Postrel | |
| 6,842,739 B2 | 1/2005 | Postrel | |
| 6,856,976 B2 | 2/2005 | Bible, Jr. et al. | |
| 6,874,037 B1 * | 3/2005 | Abram et al. | 709/248 |
| 6,898,570 B1 | 5/2005 | Tedesco et al. | |
| 6,931,538 B1 | 8/2005 | Sawaguchi | |
| 6,947,898 B2 | 9/2005 | Postrel | |
| 6,985,876 B1 | 1/2006 | Lee | |
| 7,025,674 B2 | 4/2006 | Adams et al. | |
| 7,043,752 B2 | 5/2006 | Royer et al. | |
| 7,096,190 B2 | 8/2006 | Postrel | |
| 7,127,414 B1 | 10/2006 | Awadallah et al. | |
| 7,159,014 B2 | 1/2007 | Kausik et al. | |
| 7,187,947 B1 | 3/2007 | White et al. | |
| 7,200,804 B1 * | 4/2007 | Khavari et al. | 715/230 |
| 7,222,101 B2 * | 5/2007 | Bishop et al. | 705/51 |
| 7,249,197 B1 * | 7/2007 | Roestenburg et al. | 709/246 |
| 7,289,970 B1 | 10/2007 | Siegel | |
| 7,290,061 B2 | 10/2007 | Lentini et al. | |
| 7,321,901 B1 | 1/2008 | Blinn et al. | |
| 7,349,867 B2 | 3/2008 | Rollins et al. | |
| 7,996,320 B2 * | 8/2011 | Bishop et al. | 705/50 |
| 2001/0032137 A1 | 10/2001 | Bennett et al. | |
| 2001/0032182 A1 | 10/2001 | Kumar et al. | |
| 2001/0032183 A1 | 10/2001 | Landry | |
| 2001/0034653 A1 | 10/2001 | Yamamoto | |
| 2001/0034720 A1 | 10/2001 | Armes | |
| 2001/0037295 A1 | 11/2001 | Olsen | |
| 2001/0047342 A1 | 11/2001 | Cuervo | |
| 2001/0054003 A1 | 12/2001 | Chien et al. | |
| 2002/0013728 A1 | 1/2002 | Wilkman | |
| 2002/0016734 A1 | 2/2002 | McGill et al. | |
| 2002/0026348 A1 | 2/2002 | Fowler et al. | |
| 2002/0046110 A1 | 4/2002 | Gallagher | |
| 2002/0049631 A1 | 4/2002 | Williams | |
| 2002/0052940 A1 | 5/2002 | Myers et al. | |
| 2002/0055874 A1 | 5/2002 | Cohen | |
| 2002/0056044 A1 | 5/2002 | Andersson | |
| 2002/0062253 A1 | 5/2002 | Dosh et al. | |

(56) References Cited

U.S. PATENT DOCUMENTS

| | | |
|---|---|---|
| 2002/0069109 A1 | 6/2002 | Wendkos |
| 2002/0069150 A1 | 6/2002 | Ni |
| 2002/0075844 A1 | 6/2002 | Hagen |
| 2002/0077890 A1 | 6/2002 | LaPointe et al. |
| 2002/0077978 A1 | 6/2002 | O'Leary et al. |
| 2002/0082918 A1 | 6/2002 | Warwick |
| 2002/0082920 A1 | 6/2002 | Austin et al. |
| 2002/0082990 A1 | 6/2002 | Jones |
| 2002/0087468 A1 | 7/2002 | Ganesan et al. |
| 2002/0091593 A1 | 7/2002 | Fowler |
| 2002/0095365 A1 | 7/2002 | Slavin et al. |
| 2002/0107733 A1 | 8/2002 | Liu et al. |
| 2002/0111919 A1 | 8/2002 | Weller et al. |
| 2002/0120513 A1 | 8/2002 | Webb et al. |
| 2002/0123949 A1 | 9/2002 | VanLeeuwen |
| 2002/0143614 A1 | 10/2002 | MacLean et al. |
| 2002/0146018 A1 | 10/2002 | Kailamaki et al. |
| 2002/0152116 A1 | 10/2002 | Yan et al. |
| 2002/0161630 A1 | 10/2002 | Kern et al. |
| 2002/0194069 A1 | 12/2002 | Thakur et al. |
| 2003/0004802 A1 | 1/2003 | Callegari |
| 2003/0004808 A1 | 1/2003 | Elhaoussine et al. |
| 2003/0009379 A1 | 1/2003 | Narasimhan et al. |
| 2003/0013438 A1 | 1/2003 | Darby |
| 2003/0036425 A1 | 2/2003 | Kaminkow et al. |
| 2003/0040964 A1 | 2/2003 | Lacek |
| 2003/0055722 A1 | 3/2003 | Perreault et al. |
| 2003/0061097 A1 | 3/2003 | Walker et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0087650 A1 | 5/2003 | Aarnio |
| 2003/0101131 A1 | 5/2003 | Warren et al. |
| 2003/0115456 A1 | 6/2003 | Kapoor |
| 2003/0130948 A1 | 7/2003 | Algiene et al. |
| 2003/0163425 A1 | 8/2003 | Cannon |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0216960 A1 | 11/2003 | Postrel |
| 2003/0216967 A1 | 11/2003 | Williams |
| 2003/0229584 A1 | 12/2003 | Brown |
| 2004/0015438 A1 | 1/2004 | Compiano et al. |
| 2004/0019522 A1 | 1/2004 | Bortolin et al. |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0049439 A1 | 3/2004 | Johnston et al. |
| 2004/0068438 A1 | 4/2004 | Mitchell et al. |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0128197 A1 | 7/2004 | Bam et al. |
| 2004/0215505 A1 | 10/2004 | Sullivan |
| 2004/0220854 A1 | 11/2004 | Postrel |
| 2004/0262381 A1 | 12/2004 | Mesaros |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnson et al. |
| 2005/0060225 A1 | 3/2005 | Postrel |
| 2005/0080727 A1 | 4/2005 | Postrel |
| 2005/0149394 A1 | 7/2005 | Postrel |
| 2005/0240472 A1 | 10/2005 | Postrel |
| 2006/0004629 A1 | 1/2006 | Neemann et al. |
| 2006/0020511 A1 | 1/2006 | Postrel |
| 2007/0239523 A1 | 10/2007 | Yi |

FOREIGN PATENT DOCUMENTS

| | | |
|---|---|---|
| JP | 8235276 | 9/1996 |
| JP | 2003132224 | 5/2003 |
| WO | 9926176 | 5/1999 |
| WO | 9930256 | 6/1999 |
| WO | 9952051 | 10/1999 |
| WO | 9960503 | 11/1999 |
| WO | 0014665 | 3/2000 |
| WO | 0033159 | 6/2000 |
| WO | 0033222 | 6/2000 |
| WO | 0079461 | 12/2000 |
| WO | 0101282 | 1/2001 |
| WO | 0152078 | 7/2001 |

OTHER PUBLICATIONS

USPTO; All Office Actions (Non-Final, Final, Advisory Actions, Restrictions/Elections, etc.), Notices of Allowance, 892s, 1449s and SB/08As from U.S. Appl. Nos. 09/836,213; 10/378,456; 10/027,984; 11/619,512; 11/619,523; 12/270,198; 11/864,228; 12/354,324; 11/864,241; 10/304,251; 12/541,330; 11/458,019.

USPTO; All Office Actions (Non-Final, Final, Advisory Actions, Restrictions/Elections, etc.), Notices of Allowance, 892s, 1449s and SB/08As from U.S. Appl. Nos. 12/609,384; 10/708,568; 10/708,570; 10/010,947; 12/909,709; 10/907,882; 11/752,675; 11/752,685; 12/332,248; 11/276,800; 11/695,911; 11/742,934; 11/161,906; 10/084,744; 11/382,638; 12/338,621; 09/834,478; 11/548,203.

CA; Office Action dated May 9, 2005 in Application No. 08898804CA.

CA; Office Action dated Jan. 15, 2008 in Application No. 08898804CA.

CA; Office Action dated Sep. 11, 2009 in Application No. 08898804CA.

CA; Office Action dated Jun. 7, 2010 in Application No. 08898804CA.

EP; Office Action dated May 16, 2006 in Application No. 02 717 669.2.

EP; Office Action dated Dec. 15, 2004 in Application No. 02 717 669.2.

AU; Office Action dated Mar. 17, 2005 in Application No. 2002248656.

AU; Office Action dated Oct. 5, 2005 in Application No. 2002248656.

CA; Office Action dated Jul. 27, 2010 in Application No. 08903952CA.

JP; Office Action dated Aug. 4, 2008 in Application No. 2006-501160.

JP; Office Action dated Feb. 6, 2009 in Application No. 2006-501160.

SG; Written Opinion dated Nov. 24, 2006 in Application No. 200505619-7.

AU; Office Action dated May 9, 2007 in Application No. 2004216969.

AU; Office Action dated Nov. 15, 2007 in Application No. 2004216969.

MX; Office Action dated May 9, 2008 in Application No. PA/a/2005/009378.

MX; Office Action dated Oct. 3, 2008 in Application No. PA/a/2005/009378.

MX; Office Action dated Aug. 20, 2009 in Application No. PA/a/2005/009378.

PCT; Written Opinion dated Mar. 13, 2002 in Application No. PCT/US2001/012219.

PCT; International Search Report dated Jan. 10, 2002 in Application No. PCT/US2001/012219.

Dialog file 9 # 01824832 "UK Retailers' loyal customer 'Card Wars' Prove costly (most UK have grown their sales over past 2 years by launching loyalty card programs" Supermarket News, V47, n18, p. 57+, May 5, 1997.

Fallon: "UK Retailers' Loyal Customer 'Card Wars' Prove Costly (Most major retailers in the UK have grown their sales over the past 2 years by launching loyalty-card programs)"; Supermarket News, May 5, 1997; vol. 47, No. 18, p. 57.

(56) References Cited

OTHER PUBLICATIONS

Visa International, New Technologies [online]. 2000 [retrieved on Jun 19, 2008]. Retrieved from Internet: <URL:http://web.archive.org/web/20000605185829/visa.com/nt/chip/main.html>.
WAP WTLS: Wireless Application Protocol Wireless Transport Layer Security Specification, Wireless Applications Forum, Limited, Apr. 30, 1998. [Retrieved on Jan. 19, 2009]. Retrieved from the Internet <Oct. 7, 2008>.
International Search Report and Written Opinion mailed Oct. 2, 2002 in PCT/US02/008408.
International Search Report and Written Opinion mailed Jan. 12, 2005 in PCT/US04/04457.
International Search Report and Written Opinion mailed Mar. 23, 2000 in PCT/US05/30792.
International Search Report and Written Opinion mailed Jul. 16, 2008 in PCT/US07/78253.

* cited by examiner

SYSTEM AND METHOD FOR SECURING DATA THROUGH A PDA PORTAL

CROSS REFERENCE TO RELATED APPLICATIONS

This disclosure is a continuation of, and claims priority to, U.S. patent application Ser. No. 12/332,248, entitled "System and Method for Securing Data Through a PDA Portal," filed on Dec. 10, 2008. The '248 disclosure is a divisional of, and claims priority to, U.S. Pat. No. 7,584,149 issued Sep. 1, 2009 and entitled "System and Method for Securing Data Through a PDA Portal" (aka U.S. patent application Ser. No. 11/276,800, filed on Mar. 15, 2006). The '149 patent is a divisional of, and claims priority to, U.S. Pat. No. 7,222,101 issued May 22, 2007 and entitled "System and Method for Securing Data Through a PDA Portal" (aka U.S. patent application Ser. No. 10/084,744, filed on Feb. 26, 2002). The '101 patent is a Continuation-in-Part of, and claims priority to, U.S. Pat. No. 7,398,225 issued Jul. 8, 2008 and entitled "System and Method for Networked Loyalty Program (aka U.S. Ser. No. 09/836,213, filed on Apr. 17, 2001). The '225 patent is a non-provisional application of, and claims priority to, U.S. Provisional Application No. 60/271,457, entitled "System and Method for Securing Data through a PDA Portal" filed on Feb. 26, 2001. The '225 patent is also a non-provisional application of, and claims priority to, U.S. Provisional Application Ser. No. 60/279,817, entitled "System and Method for Networked Incentive Awards Program" filed Mar. 29, 2001. All of which are hereby incorporated by reference in their entirety.

FIELD OF DISCLOSURE

The present disclosure relates generally to a personal digital assistant (PDA) portal, and more specifically, to a PDA portal which facilitates securing content while it is collected, assembled and delivered to the PDA device from the source to viewing by the user.

BACKGROUND OF THE DISCLOSURE

Incentive award programs have been developed in a variety of industries to promote customer loyalty. Generally, such programs reward customers for repeat business with the same merchant or service provider by accumulating reward points which can then be redeemed in a plurality of ways, including exchanging the reward points for additional goods and services that may be selected from an approved list or a redemption catalog for example. The reward points are usually calculated using a predetermined formula or ratio that relates a customer's purchase volume (i.e., in terms of money value or some other volume parameter) to a certain number of reward points. For example, reward points may be issued on a one-for-one basis with each dollar that a customer spends on particular goods and services.

One well-known example of a customer incentive program is a "frequent flyer" program which rewards airlines passengers with "mileage points" based upon the distances that the passengers fly with a particular airline. The mileage points may then be redeemed for free airfare or free car rentals. Other incentive award programs are designed to induce usage of particular financial instruments, such as credit cards or debit cards, by accumulating reward points or dollar value points based upon the volume of purchases made using the particular financial instrument. These types of programs may be designed such that customers of the financial institution accumulate reward points which can be redeemed for selected goods or services or, alternatively, such that customers accumulate points which have a dollar value which can be applied toward a credit or debit balance, depending on whether the instrument is a credit or debit instrument, for example.

These and other similar incentive award programs are described in U.S. Pat. Nos. 5,774,870 and 6,009,412, issued to Thomas W. Storey and assigned to Netcentives, Inc., both of which are hereby incorporated by reference to the extent that they describe an automated rewards system. For more information on loyalty systems, transaction systems, electronic commerce systems, and digital wallet systems, see, for example, the Shop AMEX™ system as disclosed in Ser. No. 60/230,190 filed Sep. 5, 2000; the MR as Currency™ and Loyalty Rewards Systems as disclosed in Ser. No. 60/197,296 filed on Apr. 14, 2000, Ser. No. 60/200,492 filed Apr. 28, 2000, and Ser. No. 60/201,114 filed May 2, 2000; a digital wallet system as disclosed in U.S. Ser. No. 09/652,899 filed Aug. 31, 2000; a stored value card as disclosed in Ser. No. 09/241,188 filed on Feb. 1, 1999; a system for facilitating transactions using secondary transaction numbers as disclosed in Ser. No. 09/800,461 filed on Mar. 7, 2001; and also in related provisional application Ser. No. 60/187,620 filed Mar. 7, 2000, Ser. No. 60/200,625 filed Apr. 28, 2000, and Ser. No. 60/213,323 filed May 22, 2000, all of which are herein incorporated by reference. Other examples of online membership reward systems are disclosed in U.S. Pat. No. 5,774,870, issued on Jun. 30, 1998, and U.S. Pat. No. 6,009,412, issued on Dec. 29, 1999, both of which are hereby incorporated by reference. A further example of a loyalty and reward program may be found at the AIR MILES® Web site, which describes a loyalty program offered by The Loyalty Group, a privately held division of Alliance Data Systems of Dallas, Tex., and which is hereby incorporated by reference. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; all of which are hereby incorporated by reference. Information on point-of-sale systems and the exploitation of point-of-sale data is disclosed in U.S. Pat. No. 5,832,457, issued on Nov. 3, 1998 to O'Brien et al., which is hereby incorporated by reference.

Portions of each of the above-described programs may be used to induce customer loyalty to particular merchants or service providers who directly provide goods or services to the consumer. In other words, these prior art frequency awards programs provide a means for retail businesses, financial institutions, and others in direct contact with the customers they service to provide incentives to their customers to encourage repeat and/or volume business. However, these programs do not sufficiently address the similar needs of businesses that are further up in the distribution chain, such as manufacturers, to promote volume purchases by customers based upon, for example, brand loyalty independent of the retail source for the purchase. Additionally, the prior art programs do not provide a means for monitoring, tracking, and/or analyzing consumer and product data across distribution channels for a particular manufacturer and/or the variety of goods which that manufacturer places into the stream of commerce for ultimate sale to consumers by a retailer.

Generally, before a product arrives at a retail establishment for sale to a consumer, the product travels through a distribution chain which originates with the manufacturer. The manufacturer typically sells its products to a wholesaler who in turn sells those products to various retailers. Most modern retailers implement some form of computerization or electronic technology in their day-to-day operations. This technology typically consists of using point-of-sale (POS) systems for automating checkout procedures, assisting sales personnel, and the like. POS systems generally include one or more automated check-out terminals which are capable of inputting or sensing and interpreting a symbol or other indicia related to the product, such as a Universal Product Code (UPC), generally comprising a machine-readable bar code coupled with a human-readable UPC number, that is printed on a label or tag which is placed on each item of merchandise to be purchased. The manufacturer may assign and mark each product that it sells with a UPC. Conventionally, once the product reaches the retailer, the retailer further identifies each product with a Stock Keeping Unit (SKU) number or code as well as other information for identifying a specific item or style of merchandise. The retailer's SKU number may be either an entirely different number used to identify each product (e.g., by style) or a modified version of the manufacturer's UPC number, derived, perhaps, by adding a SKU number to the UPC number for example.

A POS terminal, a kiosk terminal, or a sales person's handheld terminal might be coupled to a store computer system, such as a network server or some other store platform host, which is able to recognize and process UPC and/or SKU information which has been manually keyed-in or sensed and interpreted by a device, such as a barcode reader, coupled to the terminal. The computer system typically includes a database which stores information relating to the retailer's product inventory, such as stocked merchandise, a UPC and/or SKU number for each item of merchandise, and various types of merchandise identification information, such as price, inventory, style, color, size, etc., which is associated with each UPC and/or SKU number. When a customer purchases an item of merchandise, store personnel frequently use an automated terminal to read the barcode markings which are attached to the item. A computer interprets the UPC and/or SKU number comprised by the barcode, accesses the database to determine the price for each item, and maintains a running total of the total transaction price.

One problem that results from the independent identification schemes of the manufacturer and the retailers is that there is no way for the manufacturer to track the quantity of any particular product that each retailer sold. For example, even if a manufacturer obtains all of the SKU numbers representing items purchased from Retailer 1 and Retailer 2 by consumers, the manufacturer has no means for determining which SKU number corresponds to the manufacturer's UPC, since the UPC's and SKU numbers of the various retailers are not tracked and matched.

In view of the foregoing, a need exists for an incentive or loyalty program which overcomes the shortcomings of the prior art. Thus, there is a need for a system and method which provides a universal customer incentive program that networks various levels of the product distribution chain, such as manufacturers, wholesalers, and retailers, to provide incentives to consumers to purchase products not only from a particular merchant or group of merchants but also from particular manufacturers, regardless of the specific merchant who sells the manufacturer's products to the consumer. Additionally, a need exists for a system and method for gathering data which associates particular consumer purchasing behaviors and specific products or product criteria across a manufacturer's distribution channels.

Consumers may utilize computing devices to assist in the purchase and/or loyalty process, and in particular, the consumer may utilize a PDA to facilitate the purchase and/or loyalty process. A PDA (personal digital assistant) includes any mobile hand-held device that provides computing, information storage and/or retrieval capabilities for personal or business use, often used for keeping schedule calendars, note-entering and address book information. PDA products include, for example, the Hewlett-Packard's Palmtop and 3Com's PalmPilot, the details of which are hereby incorporated by reference. An increasing number of software and hardware applications have been written or developed for PDAs, including the combination of PDAs with telephones and paging systems. PDAs were originally used in a disconnected fashion, functioning as a stand-alone personal computer, but the devices can now be connected to the internet for the purposes of browsing content.

A PDA portal includes a method for collecting specific information of interest to a particular user and making it available for use on their device. The updating activity is typically executed when the device is connected to a network and "synchronized". Since there is a staggering amount of content available on the network, users typically identify which content they want refreshed each time. The PDA portal offers "channels" to the users that embody specific content available from various content providers, such as the Wall Street Journal, the New York Times, or MSN. Typically, the content from these channels that is available for access is general, public information. In other words, very little content that is specific to an individual is available for access. Although the general information has value, it is minimal when compared to the opportunity for placing personal information on the user's PDA. Examples of personal content that may be desired is their monthly account statement, a travel itinerary, or an investment portfolio and its statement. This is information that could be of use to customers in the disconnected manner that is offered by PDAs. Moreover, integrating public and private data into one source may be valuable, such as, for example, the system disclosed in U.S. Ser. No. 09/893,391 entitled SYSTEM AND METHOD FOR INTEGRATING PUBLIC AND PRIVATE DATA, filed on Jun. 28, 2001 by inventors Mitchell, et al., the entire contents of which is hereby incorporated by reference.

After a user has selected the content channels he wants to be placed onto his device, each time the user synchs his device, this content will be collected from the corresponding locations, assembled and placed onto the device. Since not all content will fit on a single page, the portal will typically interrogate the page looking for links to additional content pages. If present, additional content requests are made of the content source. Once collected, the content is assembled and stored on the connected PDA device.

Currently, the PDA portals do not offer secured personal content. If they do offer personal data, it is either not confidential (like addresses and directions) or available in a clear and unsecured state. A problem with using this method for secure content is that it is visible throughout the process. If the content includes account numbers, they may be exposed, and could be stolen and improperly used. The fundamental problem is often distributing personal content that must be secured into an unsecure environment. PDAs are inherently not secure. Being small and self-contained (to enable disconnected operation), they are easily lost or stolen, and downloading confidential content (such as account numbers or their balances) on the PDA that can be easily accessed by anyone other than the user is unacceptable by many.

In a connected environment, the conventional wisdom is to use end to end security using the standard protocols (SSL) to secure the content between its source and its use. When its use is complete, the content is usually gone, as it is not stored on the PC. A disconnected environment is different in that the content is usually stored on the device for use when the device has been removed from the network. The definition of end to end security must therefore change to accommodate this difference, such that the content be secured once it leaves its source until the user has been properly authenticated on the device.

Portals usually serve as a middle layer between the user and the content source. Traditional security measures work between the client and the source, but when a middle layer is added to the environment, there is a period when the content is exposed, when it is decrypted on the portal from the source and before it is encrypted for delivery to the users client. There is known security hardware that can be used for internet sites to insure the content is always secured. One of the difficulties of using this technology is that the portal still needs to be aware of the links that are present in the content to collect all the content of the channel.

Since most of the content currently being placed onto these devices is general, the process being used to collect the content from the different channels and prepare it for the device does not need to be secure. But, since the content must be interrogated to determine any links that must be traversed to collect all the applicable data, the content is kept in an unsecured state at the PDA portal or the PDA. Once the content has been prepared, it is moved to and placed onto the PDA as it is, unsecured. The process must therefore be amended to insure the content is secure in how it is collected, assembled and delivered to the PDA device.

SUMMARY OF THE DISCLOSURE

Consumers may utilize computing devices to assist in the purchase and/or loyalty process, and in particular, the consumer may utilize a PDA to facilitate the purchase and/or loyalty process. During the purchase and/or loyalty process, the consumer may need to insure that any content downloaded or used in association with the PDA is secure in how it is collected, assembled and delivered to the PDA device. This system and method secures the data from its source to when it is actually viewed/used by the authorized user. The PDA may have direct access to an Internet web site portal that offers secure personal content from a content provider, such as, for example, an on-line banking or financial institution. Using the web site portal, the content provider may offer personal or confidential data, such as financial information, to PDA users in a secure (e.g., encrypted) environment. The exemplary system and method may establish a PDA portal link to the web site for collecting specified information for a user and transmitting the information to the remote device. To receive the information, the PDA contacts the portal and establishes a connection, authenticates itself to the network and allows the user to complete secured transactions or transmissions over the network.

More particularly, the method for securing at least a portion of content from a source to a PDA includes, for example, synchronizing a PDA to a PDA portal; transmitting a signal to the PDA portal, wherein the signal represents content to be at least one of refreshed and downloaded to the PDA; providing identification signals from the PDA to the PDA portal, wherein the PDA portal is configured to interrogate sources containing a portion of said content to determine if secure content is included in a portion of the content, connect to a hardware encryption device which is configured to isolate imbedded links, receive encrypted content from the hardware encryption device, and transmit encrypted content to the PDA via the PDA portal; receiving the encrypted content from the PDA portal; storing the encrypted content in encrypted form; and, receiving a pass-phrase from the user to authenticate the user and decrypt the content.

BRIEF DESCRIPTION OF THE DRAWINGS

Additional aspects of the present disclosure will become evident upon reviewing the non-limiting embodiments described in the specification and the claims, in conjunction with the accompanying figures, wherein like numerals designate like elements, and wherein:

DETAILED DESCRIPTION

Figure 1:
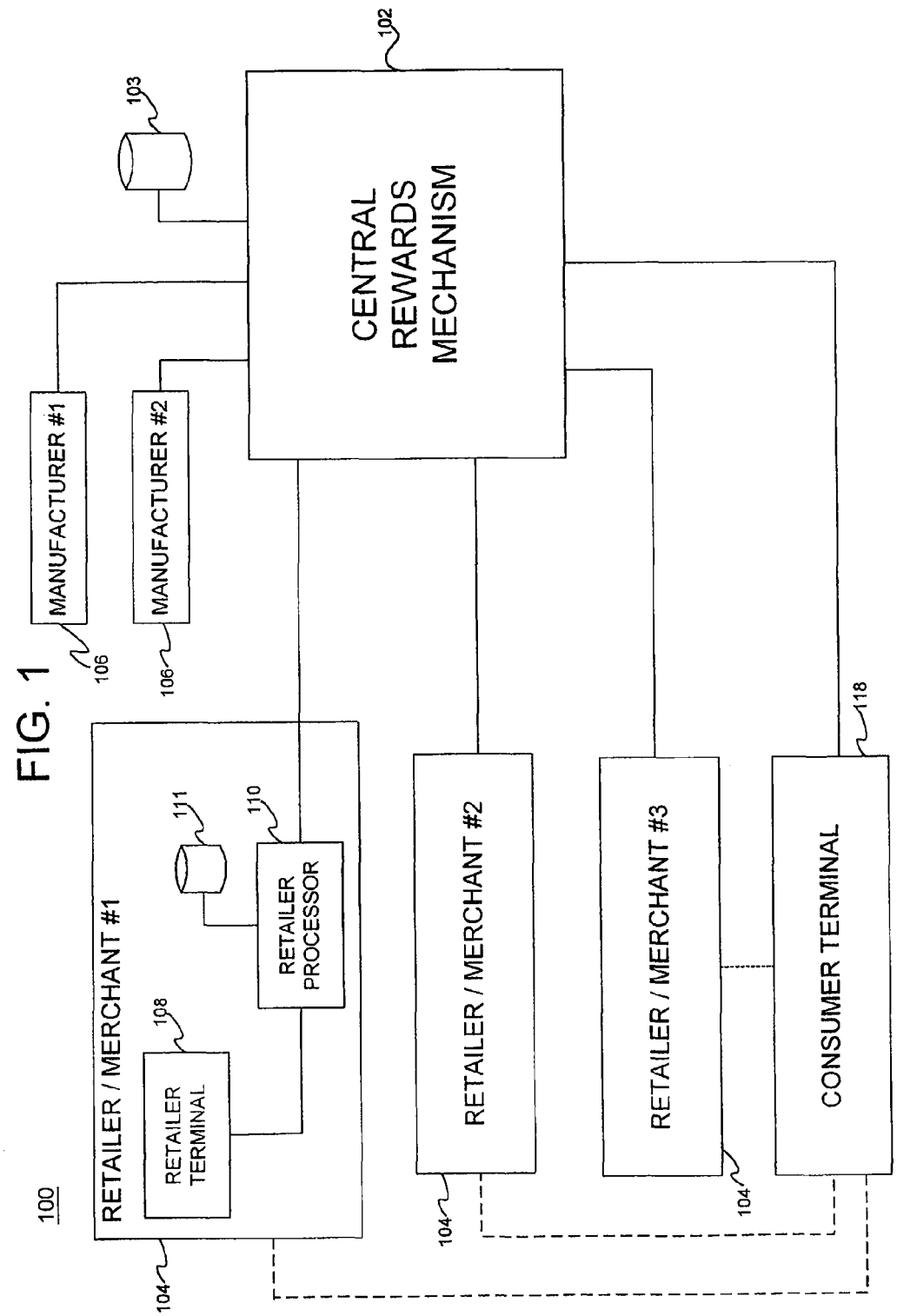
FIG. 1 is a diagram illustrating an incentive or loyalty system in accordance with various embodiments.

The following disclosure presents and describes various exemplary embodiments in sufficient detail to enable those skilled in the art to practice the disclosure, and it should be understood that other embodiments may be realized without departing from the spirit and scope of the disclosure. Thus, the following detailed description is presented for purposes of illustration only, and not of limitation, and the scope of the disclosure is defined solely by the appended claims.

The present disclosure may be described herein in terms of functional block components and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, the software elements of the present disclosure may be implemented with any programming or scripting language such as C, C++, Java, COBOL, assembler, PERL, or the like, with the various algorithms being implemented with any combination of data structures, objects, processes, routines, or other programming elements. Further, it should be noted that the present disclosure may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C", published by John Wiley & Sons (second edition, 1996), which is hereby incorporated by reference.

It should be appreciated that the particular implementations shown and described herein are illustrative of the disclosure and its best mode and are not intended to otherwise limit the scope of the present disclosure in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

Communication between participants in the system of the present disclosure is accomplished through any suitable communication means, such as, for example, a telephone network, public switch telephone network, intranet, Internet, extranet, WAN, LAN, point of interaction device (e.g., point of sale device, personal digital assistant, cellular phone, kiosk terminal, automated teller machine (ATM), etc.), online communications, off-line communications, wireless communications, satellite communications, and/or the like. One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

It further will be appreciated that users may interact with the system via any input device such as a keyboard, mouse, kiosk, personal digital assistant, handheld computer (e.g., Palm Pilot®), cellular phone, and/or the like. Similarly, the disclosure could be used in conjunction with any type of personal computer, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. Moreover, although the disclosure may be described herein as being implemented with TCP/IP communications protocols, it will be readily understood that the disclosure could also be implemented using IPX, Appletalk, IP-6, NetBIOS, OSI, or any number of existing or future protocols. Moreover, the system contemplates the use, sale, or distribution of any goods, services, or information over any network having similar functionality described herein.

Each participant or user of the system of the present disclosure, including purchasers, retailers, manufacturers, and a third-party providers, may be equipped with a suitable computing system to facilitate online communications and transactions with any other participant. For example, some or all participants may have access to a computing unit in the form of a personal computer, although other types of computing units may be used, including laptops, notebooks, handheld computers, set-top boxes, kiosk terminals, and the like. Additionally, other participants may have computing systems which may be implemented in the form of a computer-server, a PC server, a networked set of computers, or any other suitable implementations which are known in the art or may hereafter be devised.

The computing systems may be connected with each other via a data communications network as described more fully above. For example, the network may be a public network, which is assumed to be insecure and open to eavesdroppers. In various embodiments, the network is embodied as the Internet. In this context, the computers may or may not be connected to the Internet at all times. For instance, the consumer's computer may employ a modem to occasionally connect to the Internet, whereas the retailer computing system, the manufacturer computing system, and the central rewards mechanism might maintain a permanent connection to the Internet. It is noted that the network may be implemented as other types of networks, such as an interactive television (ITV) network.

The retailer's computer system may also be interconnected to a third-party provider via a second network, referred to as a payment network. The payment network represents existing proprietary networks that presently accommodate transactions for credit cards, debit cards, and other types of financial instruments or banking cards. The payment network is a closed network that is assumed to be secure from eavesdroppers. Examples of the payment network include the American Express®, VisaNet®, and the Veriphone® networks.

As will be appreciated by one of ordinary skill in the art, the present disclosure may be embodied as a method, a data processing system, a device for data processing, and/or a computer program product. Accordingly, aspects of the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose, hardware-based computer systems which perform the specified functions or steps, or suitable combinations of special purpose hardware and computer instructions.

As used herein, the terms "user" and "participant" shall interchangeably refer to any person, entity, charitable organization, machine, hardware, software, or business who accesses and uses the system of the disclosure, including consumers, retailers, manufacturers, and third-party providers. Participants in the system may interact with one another either online or off-line. As used herein, the term "online" refers to interactive communications that takes place between participants who are remotely located from one another, including communication through any of the networks or communications means described above or the like.

The term "manufacturer" shall include any person, entity, charitable organization, machine, software, hardware, and/or the like that manufactures, distributes, or originates a product or service which may ultimately be offered to a consumer directly or indirectly through a retailer. The term "manufacturer" may also include any party that generates and/or provides manufacturer item identifiers. The term "retailer" shall include any person, entity, charitable organization, machine, software, hardware, and/or the like that that offers a product or service to a consumer. As used herein, the term "retailer" is used interchangeably with the term "merchant". Moreover, in this context, a retailer or merchant may offer or sell, either online or offline, products and/or services made or supplied by at least one manufacturer. As used herein, the phrases "network level" and "network-wide level" shall refer to a system that includes more than one retailer and at least one manufacturer.

As used herein, the terms "purchaser", "customer", "consumer", and "end-user" may be used interchangeably with each other, and each shall mean any person, entity, charitable organization, or business which uses a consumer ID to participate in the present system. A "consumer ID", as used herein, includes any device, code, or other identifier suitably configured to allow the consumer to interact or communicate with the system, such as, for example, a rewards card, charge card, credit card, debit card, prepaid card, telephone card, smart card, magnetic stripe card, bar code card, authorization/access code, personal identification number (PIN), Internet code, other identification code, and/or the like. Additionally, a "consumer ID" may comprise any form of electronic, magnetic, and/or optical device capable of transmitting or downloading data from itself to a second device which is capable of interacting and communicating with such forms of consumer ID.

A consumer may register to participate in the present system by any methods known and practiced in the art. For example, a consumer may be enrolled automatically (e.g. if the consumer holds an existing account with the system administrator), over the phone, at the point of sale through a paper application or verbal interview, through the mail, or through instant enrollment online. Consumer enrollment data may comprise any of the following: name; address; date of birth; social security number; email address; gender; the names of any household members; a credit card number for charging any fees that may be associated with participation in the system; survey data; interests; educational level; and/or any preferred brand names. Upon enrollment, the consumer receives a consumer ID. The consumer ID may be associated with a household account which specifies the consumer as a primary member and permits the identification of supplementary members associated with the consumer's household who may also earn reward points for the consumer.

A "consumer profile", as used herein, shall refer to any data used to characterize a consumer and/or the behavior of a consumer. In the context of a commercial transaction, "a consumer profile" shall be understood to include, for example, the time and date of a particular purchase, the frequency of purchases, the volume/quantity of purchases, the transaction size (price), and/or the like. Additionally, in other transactional contexts, the term "consumer profile" shall also be understood to include non-purchase behaviors of a consumer, such as consumer enrollment data, visiting a Web site, referrals of prospective participants in the system, completion of a survey or other information gathering instrument, and/or the like. For instance, a participating online consumer may earn rewards points automatically through a triggering event, such as visiting a Web site, completing an online survey, or clicking on a banner advertisement for example. Offline, a participating consumer may earn rewards points by completing a task or showing their consumer ID to the cashier and triggering the cashier to provide a "behavior" ID which may be input (e.g., by scanning a bar code on a paper survey for example) into the POS terminal. Further, any aspects of the consumer profile may be used in the context of data analysis.

A "third-party provider" may comprise any additional provider of goods and/or services to a consumer. Specifically, a "third-party provider" includes any party other than the particular manufacturer and retailer who is involved in a transaction with a consumer. A third-party provider may include, for example, a financial institution, such as a bank or an issuer of a financial instrument (such as a credit card or a debit card). A third-party provider may also include a provider of goods and services which are offered as awards to consumers in exchange for a requisite number of reward points.

Though the disclosure may generically be described with reference to a series of transactions which transfer a good or service from an originating party to an intermediary party and a subsequent transaction which transfers the good or service from the intermediary party to an end-user of that good or service, for convenience and purposes of brevity and consistency, the present disclosure generally refers to the originating party as a manufacturer, the intermediary party as a retailer, the end-user as a consumer, and a good or service as a product or item. However, it will be recognized by those of ordinary skill in the art that the retailer need not provide a product or item to a consumer in exchange for monetary currency. While this often may be the case, the present disclosure is not so limited and includes transactions which may be gratuitous in nature, whereby the retailer transfers a product or item to a consumer without the consumer providing any currency or other value in exchange. It is further noted that additional participants, referred to as third-party providers, may be involved in some phases of the transaction, though these participants are not shown. Exemplary third-party providers may include financial institutions, such as banks, credit card companies, card sponsoring companies, or issuers of credit who may be under contract with financial institutions. It will be appreciated that any number of consumers, retailers, manufacturers, third-party providers, and the like may participate in the system of the present disclosure.

As used herein, the term "UPC" and the phrase "manufacturer item identifier" shall refer to any symbol or indicia which provides information and, in various exemplary embodiments, shall refer to any number, code, or identifier assigned by a manufacturer and associated with an item, including any type of goods and/or services, ultimately offered to a consumer or other end-user. Colloquially, a UPC is sometimes referred to as a SKU number. However, as used herein, the term "SKU" and the phrase "retailer item identifier" shall refer to any symbol or indicia which provides additional information and, in various exemplary embodiments, shall refer to any number, code, or identifier assigned by a retailer and associated with an item, including any type of goods and/or services, offered to a consumer or other end-user.

"Purchase data", as used herein, comprises data relating to the offer of any item to a consumer or other end-user. Purchase data may include any of the following: an item purchased, an item price, a number of items purchased, a total transaction price, a payment vehicle, a date, a store identifier, an employee identifier, a retailer item identifier, a loyalty identifier, and/or the like.

"Retailer ID", as used herein, comprises any symbol, indicia, code, number, or other identifier that may be associated with a retailer of any type of goods and/or services offered to a consumer or other end-user. A retailer ID may also include or be associated with a "store ID", which designates the location of a particular store. A "manufacturer ID" comprises any symbol, indicia, code, number, or other identifier that may be associated with a manufacturer of any type of goods and/or services ultimately offered to a consumer or other end-user.

An "award" or "reward" may comprise any quantity of products, services, coupons, gift certificates, rebates, reward points, bonus points, credits or debits to a financial instrument, any combination of these, and/or the like.

"Data analysis", as used herein, shall be understood to comprise quantitative and qualitative research, statistical modeling, regression analyses, market segmentation analyses, econometrics, and/or the like. Such analyses may be used to predict consumer behaviors and/or correlate consumer profiles, retailer data, manufacturer data, and/or product or service data.

The system of the present disclosure associates or maps manufacturer UPC data and retailer SKU data on a network level to reward consumers and/or to analyze the data for a variety of business purposes, such as market segmentation analyses and/or analyses relating to consumer spending behaviors or patterns for example. Rather than simply capturing transactions at a Record of Charge (ROC) level, that is, recording consumer purchases in a general fashion by designating purchase categories (such as "clothing", "electronics", or "hardware" for example), the system identifies the particular item purchased (such as "jeans", "stereo", or "hammer" for example) as well as its corresponding manufacturer. By matching or associating the retailer SKU and the manufacturer's UPC, the system permits the standardization of goods and/or services codes at the network level. This standardization not only permits a record of both the specific item purchased and its manufacturer, regardless of the particular retailer involved in the transaction, but it permits the mapping of multiple consumers, multiple goods and/or services, multiple retailers, and/or multiple manufacturers to advantageously cross-market goods and services to consumers.

In accordance with one aspect of the disclosure, the association of UPC and SKU data by the system facilitates implementation of an incentive or loyalty program by providing a universal rewards currency which may be "spent" by participants who have earned rewards and accepted by the other participants in the multi-tiered network created by the system.

The network may comprise any number of participants, including consumers, retailers (and any of their employees), manufacturers, third-party providers, and the like. Each of these categories of participants may be considered a tier in the network, and each participant within the various tiers may design and implement an independent rewards scheme within the context of the universal environment provided by the system. For example, Manufacturer 1 may produce and assign a UPC to Item X. Item X may subsequently be offered for sale by both Retailer 1 and Retailer 2. Retailer 1 and Retailer 2 may then each assign an independent SKU number to Item X to facilitate their own tracking, inventory, and pricing schemes. A consumer may then purchase Item X from both Retailer 1 and Retailer 2.

Since the system is capable of processing, associating, and quantifying a variety of data, including consumer data, employee data, retailer data, manufacturer data, SKU number data corresponding to Item X, and UPC data assigned by Manufacturer 1, for example, this data can then be used by the manufacturer, the retailer, the system administrator, and/or a third-party provider to provide rewards to consumers, employees, retailers, etc. For example, a manufacturer may provide frequency-based incentives, such as every $10^{th}$ purchase of a particular item will be discounted by 50% for example, independent of and/or in addition to any incentives offered by the specific retailer involved in the transaction. Additionally, the manufacturer may provide sales incentives to the employees of retailers independent of and/or in addition to any employee incentive programs that the retailers may choose to implement.

Since rewards, which may be in the form of rewards points, may be earned across the various tiers in the network, rewards may also be used or spent across the various tiers in the network. Thus, any rewards points that an employee, for example, may earn by promoting a particular manufacturer's line of products, may be "spent" by that employee on goods or services provided by any participant in the network, not merely at the retailer who employs that employee. Likewise, any rewards points earned by a consumer may be spent on goods or services offered by any participant in the network.

In accordance with another aspect of the disclosure, the association of UPC and SKU data by the system facilitates data analysis on a network level based upon several factors, including any of the following: consumer ID, consumer profile, retailer ID, SKU number, UPC, manufacturer ID, and/or the like. The system may compile any of the above data across multiple participants for the purpose of data analysis, such as analyses which may be employed in strategic planning and marketing for example. The system of the disclosure may be used to compile, analyze, and report data in a manner which would inform any or all network participants that, for example, a specific consumer (1) has made multiple purchases of particular manufacturers' products; (2) has spent Q dollars over a certain time period (3) at specific multiple retailers; and (4) of the purchases made, R dollars went towards the purchase of Product 1, S dollars went towards the purchase of Product 2, and T dollars went towards the purchase of Service 1. Moreover, the system may be used to compile, analyze, and report data that enable a retailer, a manufacturer, and/or a third-party provider to create a variety of targeted marketing promotions, such as, for example, (1) marketing Product 1 offered by Manufacturer 1 to consumers who purchase Product 2 offered by Manufacturer 2; (2) marketing Product 1 offered by Manufacturer 1 and sold by Retailer X to consumers who purchase Product 2 offered by Manufacturer 2 at Retailer Y; (3) marketing Product 1 offered by Manufacturer 1 and sold by Retailer X to consumers who purchase Product 2 offered by Manufacturer 2 at Retailer Y five times a year. It will be appreciated that these are but a few of the many possible applications for data gathered and generated by the system of the present disclosure.

In accordance with a further aspect of the disclosure, the system administrator may allocate rewards points to participants in the system. In various embodiments, participating retailers and/or manufacturers may purchase points from the system administrator and the points are then allocated to an account associated with the retailer and/or manufacturer. In various alternate embodiments, the system administrator may give or donate points to participating retailers and/or manufacturers. The system administrator maintains an account with each of the participating retailers and manufacturers and tracks available points balances and/or balances owing on a rolling basis. The points purchased by the retailers and/or manufacturers may then be earned by and issued to consumers in a manner that is predetermined by the retailer and/or manufacturer involved in the transaction with the consumer. For example, Retailer 1 may purchase 10,000 points from the system administrator and then offer consumers 1 point for every $10 dollars spent in Retailer 1's store or, perhaps, some number of points for every fifth transaction in the store. Moreover, Manufacturer 1, who produces the product offered by Retailer 1, may also purchase points from the system administrator. Thus, when a consumer purchases Manufacturer 1's product at Retailer 1, Manufacturer 1 may issue some number of points to the consumer. The issuance of points, either by retailers or manufacturers, may be based upon any selected criteria, including a points-for-dollars ratio, a defined quantity of points per item or per transaction, some combination of these, and/or the like.

The system administrator maintains an account for each participating consumer and apprises the consumer of the points totals and account activity. The consumer may review the total number of points in the account either online or off-line, such as through a periodic statement sent by the system administrator or through the use of a communications network, such as the Internet, for example. Points in the consumer's account are accumulated across the multiple retailers and/or manufacturers participating in the system. Thus, points earned by a consumer based upon transactions with different retailers and/or manufacturers are combined, resulting in a rapid accrual of points. The system administrator offers a catalog of products and services, which may be either online or off-line, from which consumers may select rewards in exchange for accrued points. In this manner, consumers advantageously earn points based upon their everyday purchases of products and services, these points are accrued across retailers and/or manufacturers, and points redemption takes place through a single, universal catalog of rewards.

In accordance with the present disclosure, FIG. 1 is a diagram illustrating various exemplary embodiments of an incentive or loyalty system 100. System 100 comprises a central rewards mechanism 102; a plurality of retailer/merchant systems 104; and at least one manufacturer 106. One skilled in the art will appreciate that system 100 may comprise any number of retailer systems 104 and any number of manufacturers 106.

The central rewards mechanism 102 manages the incentive or loyalty program of the system 100. In various exemplary embodiments, central rewards mechanism 102 receives, processes, and stores manufacturer data, such as information regarding products and/or services and UPC data, transmitted by manufacturers 106 who have enrolled in the system 100. Manufacturers 106 may transmit data to central rewards mechanism 102 in any form and by any means known in the art, including any of the communications means described above. The manufacturer data is stored by the central rewards mechanism 102 in database 103. Database 103 may be any type of database, such as relational, hierarchical, object-oriented, and/or the like. Common database products that may be used to implement database 103 include DB2 by IBM (White Plains, N.Y.), any of the database products available from Oracle Corporation (Redwood Shores, Calif.), Microsoft Access by Microsoft Corporation (Redmond, Wash.), or any other database product. Database 103 may be organized in any suitable manner, including as data tables or lookup tables.

The central rewards mechanism 102 may receive and process consumer ID information and purchase data from any of the retailer systems 104. The central rewards mechanism 102 may also associate a particular consumer ID with the purchase data and a corresponding manufacturer item identifier. In various embodiments, the central rewards mechanism 102 performs an analysis involving any of the following: a consumer ID, purchase data, a points ratio, a consumer profile, a retailer ID, and a manufacturer ID. The analysis may be dependent upon an the association of the consumer IDs, the purchase data, and the manufacturer item identifier. The analysis may further comprise, for example, a calculation of rewards points and/or other analyses for purposes of market segmentation, determining consumer spending behavior, correlating spending behavior and consumer demographics, and/or the like, as described in greater detail above.

In various exemplary embodiments, the central rewards mechanism 102 stores and informs a consumer of the rewards points that have been earned by a particular transaction as well as accumulated over time. The number of rewards points calculated and awarded by the central rewards mechanism 102 for a particular purchase may depend upon a predetermined rewards ratio. The rewards ratio may be determined by the retailer, the system administrator, the manufacturer of the purchased item, and/or any other suitable third-party. For example, if a participating consumer buys a product from a retailer for $100 and if the retailer rewards ratio is one reward point for each dollar of the purchase price (i.e., one-for-one), once the consumer's consumer ID is identified by the system, the consumer is credited with a suitable number of rewards points from the retailer, which, in this case, would be 100 points. However, if the manufacturer also chooses to issue rewards points for the item purchased, the manufacturer may select a points ratio that is different from the retailer's selected ratio. In the illustrated example, if the manufacturer's selected points ratio is two-for-one, then the consumer will be awarded an additional 200 points from the manufacturer for this single $100 purchase. In this manner, the system of the disclosure may provide "earn accelerators" through which consumers may accumulate rewards points at comparatively rapid rate. In other words, a single purchase may generate rewards points for a consumer from any or all of a retailer, a manufacturer, and/or a third-party provider, and those rewards points may be used as rewards currency by the consumer throughout the network established by the system of the disclosure.

In various exemplary embodiments, retailer system 104 comprises a retailer terminal 108 and a retailer processor 110 in communication with database 111. Retailer terminal 108 comprises any device capable of identifying a consumer ID. Exemplary devices for identifying a consumer ID may include a conventional card reader which recognizes a magnetic stripe or bar code associated with a consumer ID, a biometric device, a smart card reader which recognizes information stored on a microchip integrated with a consumer ID, and any device capable of receiving or uploading consumer ID data transmitted electronically, magnetically, optically, and/or the like. In various embodiments, retailer terminal 108 and retailer processor 110 are co-located at a retail store. In other various embodiments, retail terminal 108 and retailer processor 110 are remote from each other.

Figure 2:
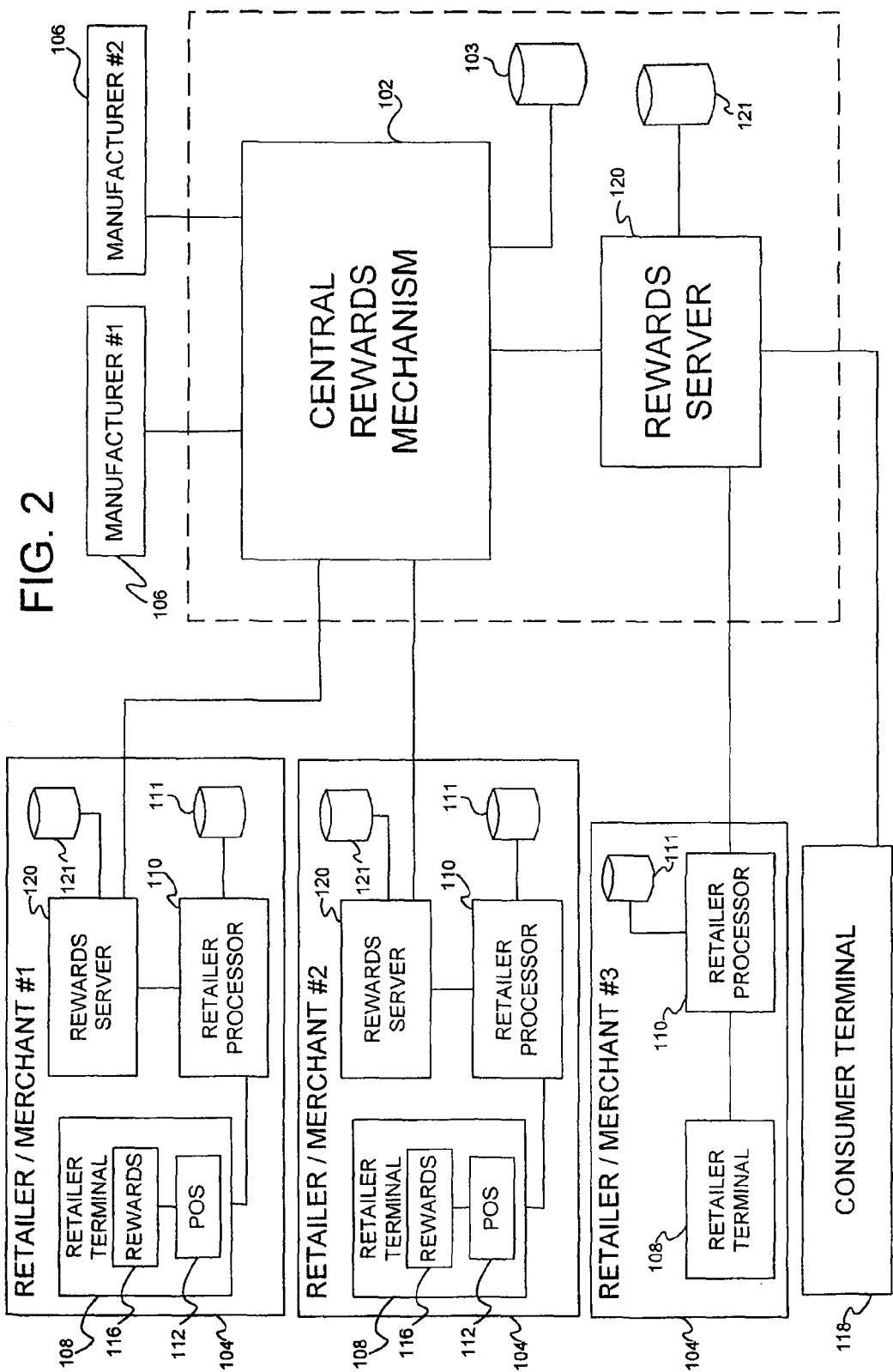
FIG. 2 is a diagram illustrating an incentive or loyalty system in accordance with various embodiments.

In various exemplary embodiments, as illustrated in FIG. 2, retailer terminal 108 comprises a retailer POS terminal 112, such as a cash register for example. When a consumer ID is used at the time an item is purchased, purchase data, including a SKU number, is input, sensed, or otherwise recognized by terminal 108, and then the purchase data is processed and stored by retailer processor 110. Retailer processor 110 comprises or is in communication with a suitable database 111 or other storage device for maintaining and storing purchase data and any other suitable retailer information. Database 111 may be any type of database, such as any of the database products described above for example. Database 111 may be organized in any suitable manner, including as data tables or lookup tables. Purchase data that is stored in database 111 is available to the retailer's local back office system (not shown) for inventory, accounting, tax, data analysis, and other purposes. The captured purchase data may include the item purchased, the item's unit price, the number of items purchased, the date, the store location, an employee ID, and any other information related to the purchase. In various exemplary embodiments, retailer processor 110 may also receive, process, and store manufacturer data, such as information regarding products and/or services and UPC data, from manufacturers 106 who have enrolled in the system 100. The manufacturer data may be stored in any suitable form, including data tables or lookup tables.

Figure 3:
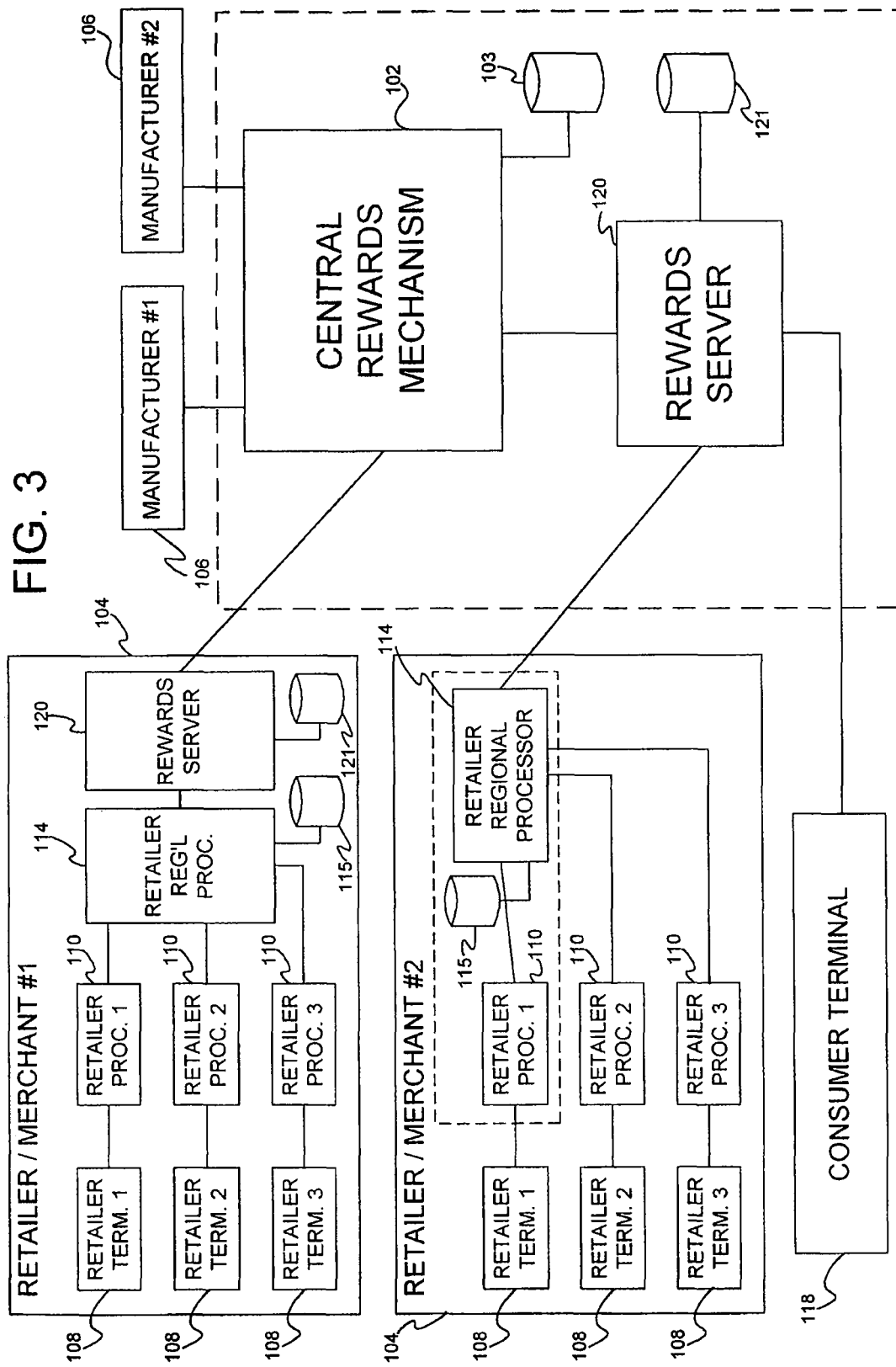
FIG. 3 is a diagram illustrating an incentive or loyalty system in accordance with various embodiments.

In accordance with the various exemplary embodiments illustrated in FIG. 3, purchase data may also be transmitted to and stored and processed by a retailer regional processor 114 (or, alternatively, a retailer national database (not shown)) in communication with database 115 for the purpose of further back office and cumulative data analysis. Database 115 may be any type of database, such as any of the database products described in greater detail above for example. Database 115 may be organized in any suitable manner, including as data tables or lookup tables. In various exemplary embodiments, retailer processor 110 optionally may be integrated with retailer regional processor 114 (illustrated by the phantom lines encompassing Retailer Processor 1 and retailer regional processor 114 within the system of Retailer/Merchant #2), thereby forming a single device. In other various embodiments, retailer processor 110 and retailer regional processor 114 are separate devices which may be either co-located with each other or remotely located from one another. For example, in various embodiments, retailer processor 110 and regional processor 114 are co-located at a particular retail store. In other various embodiments, retailer processor 110 is located at a particular retail store and retailer regional processor 114 is remotely located at a regional office.

Regardless of the location of retailer regional processor 114, retailer regional processor 114 receives and processes similar information from each of the retailer processors 110 associated with each of the retail stores owned by the same retailer. Whether the system 100 comprises a retailer regional processor 114 or a retailer national processor may be a function of the number of stores maintained by a particular retailer. That is, a larger retailer who has numerous stores throughout the country, for example, may choose to have a plurality of regional processors, while a smaller retailer with a few stores scattered across the country may be better served by a single, national processor. In exemplary embodiments, the retailer regional processors 114 and/or national processors communicate with a suitable database 115 or other storage device which is configured to store and maintain purchase data and any other suitable retailer information. In other various exemplary embodiments, retailer regional processor 114 may receive, process, and store manufacturer data, such as information regarding products and/or services and UPC data, from manufacturers 106 who have enrolled in the system 100. The manufacturer data may be stored in any suitable form, including data tables or lookup tables.

With momentary reference to FIG. 2, retailer terminal 108 may comprise a rewards terminal 116 through which a consumer may be updated with regard to various aspects of the system. For example, rewards terminal 116 may inform a consumer of the number of reward points that they have accumulated from all system participants and the types of awards that may be obtained using those reward points. Moreover, rewards terminal 116 may suggest to the consumer various awards for which the consumer is eligible based upon the rewards points generated by the consumer's network-wide purchases. In this context, network-wide purchases include any purchases of items corresponding to retailers and/or manufacturers participating in the system 100.

In various exemplary embodiments, rewards terminal 116 operates in real-time. In this context, "real-time" means that reward points are immediately, or nearly immediately, updated at the time purchases are made and are therefore immediately redeemable by the consumer at the a point of sale. Thus, for example, a consumer may be informed by rewards terminal 116 at the point of sale that the item being purchased by the consumer may be purchased using the consumer's accumulated reward points, including points accumulated on a network level. Points accumulated on a network level enable consumers to accumulate points more rapidly than would be possible if only a single retailer or group of retailers were issuing the points. In various embodiments, rewards terminal 116 may update a consumer's rewards points in real-time and, in response to the consumer's particular points total, issue a coupon, a gift certificate, and/or additional bonus points to the consumer.

In other exemplary embodiments, the system may operate in batch mode, wherein points totals are calculated, stored, and periodically updated for access by the retailer terminal 108, including POS terminal 112 and/or rewards terminal 116. Thus, in various embodiments, the consumer may be notified of available points sometime after a purchase, or a suggestive sale may take place after a purchase. The total point count or suggestive sale may take into account points generated and accumulated as the result of network-wide purchases.

In various alternate embodiments of the disclosure, retailer terminal 108 may include a rewards terminal 116 but not a POS terminal 112; a POS terminal 112 but not a rewards terminal 116; or a POS terminal 112 in communication with a rewards terminal 116. In alternate embodiments, where terminal 108 includes a POS terminal 112 and a rewards terminal 116, the two terminals 112 and 116 may be variously implemented as separate terminals, integrated terminals, or software within a device. In other embodiments, where terminal 108 comprises a rewards terminal 116 but not a POS terminal 112, terminal 108 may be a kiosk terminal located within a retail store or some other remote terminal which is capable of recognizing a consumer ID and communicating with the system 100. A consumer may use independent rewards terminal 116 to do, for example, any of the following: view accumulated reward points totals; view potential awards which the consumer may obtain in exchange for various numbers of points; select an award; redeem rewards points for a selected award; request and/or receive a reward points advisory statement; and/or view a directory of participating retailers, manufacturers, and third-party providers.

In other exemplary embodiments, system 100 further comprises a consumer terminal 118. Consumer terminal 118 is any remote terminal through which a consumer may access other aspects of the system 100. Consumer terminal 118 may comprise any of the input devices, computing units, or computing systems described above. Further, consumer terminal 118 communicates with the system 100 through any of the communications networks described above. In various embodiments, consumer terminal 118 permits a consumer to engage multiple facets of the system 100 in an interactive online communications environment. The interactive online environment made available through consumer terminal 118 is an extension of the network-level incentive award program and is implemented in conjunction with other aspects of the system 100. In this context, a consumer may uses consumer terminal 118 for a variety of purposes. In various embodiments, consumer terminal 118 may be used to communicate with and receive information from the central rewards mechanism 102. For example, a consumer may use consumer terminal 118 to do any of the following: enroll in the system; receive statements or reports regarding accumulated reward points totals; receive bonus details; view potential awards which the consumer may obtain in exchange for various numbers of points; select an award; receive redemption information; view points adjustments; redeem rewards points for a selected award; request and/or receive a reward points advisory statement; receive information regarding where and how points were earned and/or how points were redeemed; receive information regarding expiration dates for points earned; receive information relating to any applicable fees; receive information regarding marketing promotions; and/or view a directory of participating retailers, manufacturers, and/or third-party providers.

In other embodiments, consumer terminal 118 may be used to interact with and/or make purchases and generate rewards points from participating online retailers, as illustrated by the various phantom lines in FIG. 1. The online retailer may then communicate with the central rewards mechanism 102 to transmit and process a consumer ID, purchase data, etc., as described above with reference to retailer 104 of FIG. 1. Information communicated between the online consumer, the online retailer, and the online central rewards mechanism may include, for example, product or service information, prices, availability of the product or service, shipping information, rewards points information, available awards, information regarding points ratios and points redemption, and/or the like. In various embodiments, consumer terminal 118 operates in real-time, as described above with respect to rewards terminal 116. In other embodiments, the consumer terminal 118 may operate in batch mode, as described above. In still further embodiments, consumer terminal 118 operates in a manner which includes aspects of both real-time functionality and batch mode functionality.

In accordance with a further aspect of the disclosure, the system 100 may comprise a rewards server 120 in communication with a database 121, as illustrated in FIG. 2. Database 121 may be any type of database, such as any of the database products described above for example. Database 121 may be organized in any suitable manner, including as data tables or lookup tables. In various exemplary embodiments, rewards server 120 may be any hardware and/or software that is configured to communicate with the central rewards mechanism 102 and either the retailer processor 110 or the retailer regional processor 114. In alternate exemplary embodiments, rewards server 120 may be integrated with retailer system 104; rewards server 120 may be integrated with central rewards mechanism 102; or rewards server 120 may be separate from both retailer system 104 and central rewards mechanism 102. In further embodiments, the rewards server 120 may communicate with both a retailer national processor (not shown) and the central rewards mechanism 102.

In various exemplary embodiments, rewards server 120 receives, processes, and stores both manufacturer data and retailer data. Manufacturer data may include descriptions of products and/or services and UPC data transmitted from manufacturers 106 who have enrolled in the system 100. The manufacturer data may be stored in any suitable form, including data tables or lookup tables. Retailer data may include descriptions of products and/or services and SKU data transmitted from retailers 104 who have enrolled in the system 100. The retailer data may be stored in any suitable form, including data tables or lookup tables.

In various exemplary embodiments, the rewards server 120 performs a plurality of functions that might otherwise be performed by the central rewards mechanism 102. For example, since rewards calculations require significant processing and memory resources, performance of calculations processing by the rewards server 120 at the regional level lessens the processing load on the central rewards mechanism 102, thereby increasing the efficiency of the central rewards mechanism 102. In various exemplary embodiments, each retailer's region, which comprises a plurality of that retailer's stores or outlets, accesses a rewards server 120 which acts as an intermediary between the retailer regional processor 114 and the central rewards mechanism 102. This configuration relieves the processing, power, memory, and other requirements of the central rewards mechanism 102. Moreover, each retailer is but one of many retailers that may participate in the network level rewards structure. Accordingly, a plurality of rewards servers 120 may be in communication with the central rewards mechanism 102 as well as each of the participating retailer regional processors 114, further alleviating the processing burden and freeing up the resources of the central rewards mechanism 102.

Implementations which include at least one independent rewards server 120 are also advantageous because cost-effective communications links may be used to facilitate communications with the central rewards mechanism 102. Performance by the rewards server 120 of many of the "intelligence functions" of the system 100, permits transmission of only particular forms of purchaser information to the central rewards mechanism 102. In various exemplary embodiments, data sent from the rewards server 120 to the central rewards mechanism 102 may include the consumer ID and the total number of rewards points earned by a consumer in a particular transaction. In other exemplary embodiments, data transmitted by the rewards server 120 to the central rewards mechanism 102 may also include any pre-selected aspect of the consumer profile, any pre-selected aspect of the purchase data, and/or any other pre-selected data associated with a consumer, a retailer, a manufacturer, and/or a third-party provider. Pre-selection of the types of data transmitted by the rewards server 120 to the central rewards mechanism 102 may be conducted by the system administrator, a retailer, a manufacturer, and/or a third-party provider. Thus, data which may be useful for purposes of data analysis but unrelated to the rewards feature, such as the characteristics of the particular item purchased for example, may not need to be transmitted to the central rewards mechanism 102.

Exemplary functions performed by the rewards server 120 may include the association of UPC and SKU data; manipulation of the rewards criteria applicable in particular cases, which may further depend upon the retailer, manufacturer, and/or third-party provider involved in a specific transaction with a consumer; calculation of rewards benefits earned by the consumer; filtration functions for determining which data is transmitted from the rewards server 120 to the central rewards mechanism 102; and/or various types of data analyses, as described above. In various exemplary embodiments, the retailer system 104 houses, maintains, and updates the hardware and/or software of the rewards server 120. In other embodiments, rewards server 120 may be housed, maintained, and updated by the system administrator.

In accordance with other various embodiments, the system 100 permits an open payment system. Since the disclosure generally provides that consumer participation in the system is based upon a consumer ID, a purchaser may use any of multiple payment vehicles (such as cash, check, charge card, credit card, debit card, MasterCard®, Visa®, and/or the American Express® Card for example) to make purchases at the various retailers and still participate in the system. Thus, in various embodiments, the consumer ID is independent of any particular payment vehicle, such as a credit card for example.

However, alternate embodiments of the disclosure may be implemented which associate a consumer ID with a particular payment vehicle, such as a consumer's credit card account, charge card account, debit card account, and/or bank account for example. In various embodiments, the retailer conducting the transaction need only participate in the system to the extent that the retailer provides its SKU data to the system 100, such as to the rewards server 120. In other words, when a consumer ID is associated with an instrument (e.g., a credit card) from a third-party provider, the retailer need not provide a rewards terminal or other terminal capable of processing the consumer ID, since the third-party provider may process the consumer ID as part of the payment transaction. Thus, in various embodiments, rewards benefits may be earned by the consumer on a network-wide level without the retailer's direct participation in the rewards feature (notwithstanding the retailer's participation in transmitting SKU data to the system). Moreover, it will be appreciated that a single consumer ID may be associated with multiple third-party payment vehicles, thereby allowing a consumer to generate rewards points regardless of the particular payment vehicle selected for a particular purchase.

Figure 4:
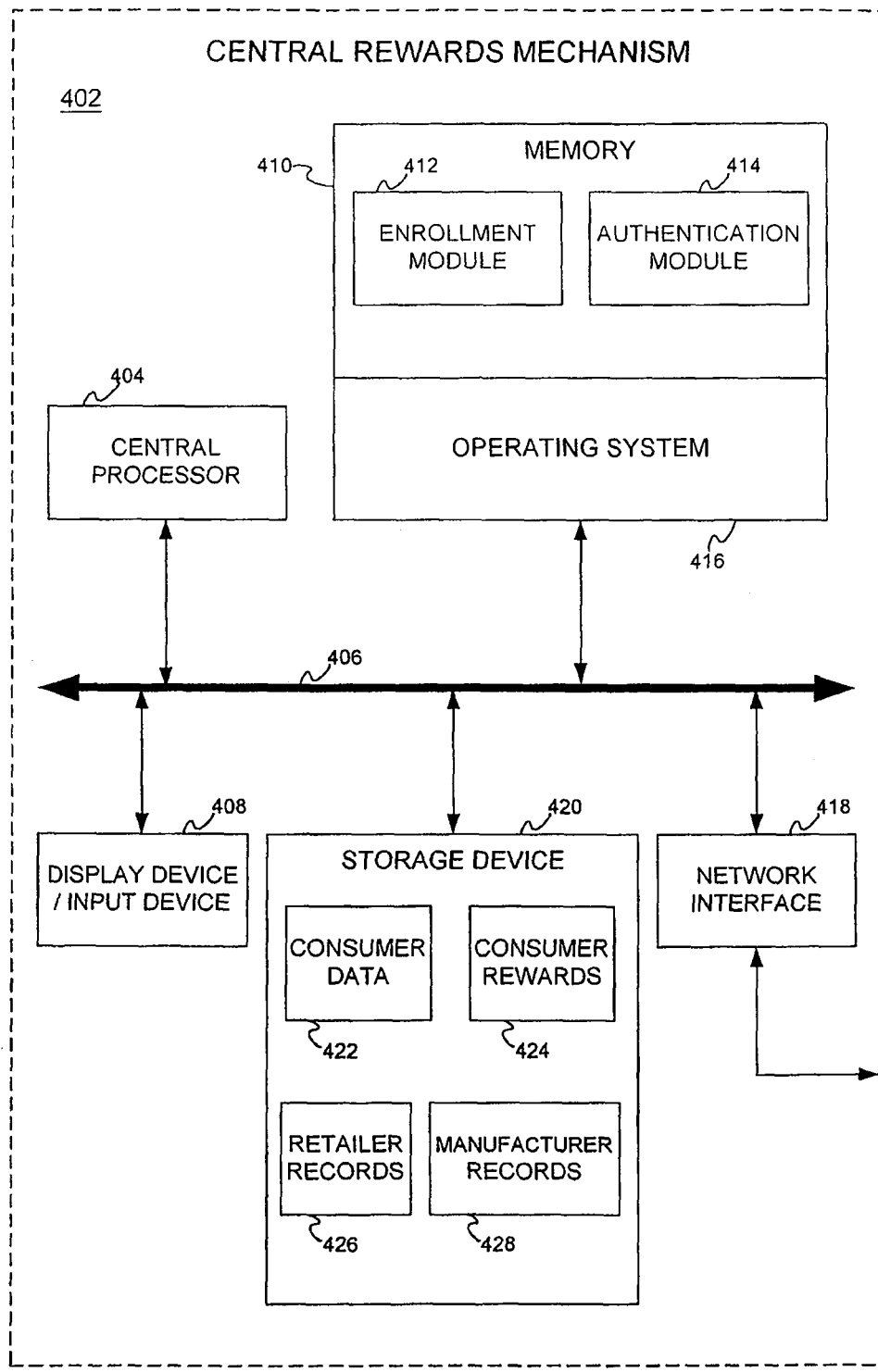
FIG. 4 is a diagram illustrating a central rewards mechanism in accordance with various embodiments.

With reference to FIG. 4, an exemplary central rewards mechanism 402 includes a central processor 404 in communication with other elements of the rewards mechanism 402 through a system interface or bus 406. A suitable display device/input device 408, such as a keyboard or pointing device in combination with a monitor, may be provided for receiving data from and outputting data to a user of the system. A memory 410 associated with the rewards mechanism 402 includes various software modules, such as an enrollment module 412 and an authentication module 414 for example. The memory 410 preferably further includes an operating system 416 which enables execution by processor 404 of the various software applications residing at enrollment module 412 and authentication module 414. Operating system 416 may be any suitable operating system, as described above. Preferably, a network interface 418 is provided for suitably interfacing with other elements of the incentive awards system, such as the elements described above with reference to FIGS. 1-3.

Lastly, a storage device 420, such as a hard disk drive for example, preferably contains files or records which are accessed by the various software modules, such as enrollment module 412 and authentication module 414. In particular, consumer data 422 comprises information received from a consumer upon registration with the rewards mechanism 402. Consumer rewards 424 comprises data corresponding to each consumer's rewards account. Consumer rewards 424 may include cumulative rewards points totals as well as historical totals and rewards account activity over time. Retailer records 426 comprises information received from the various participating retailers. Manufacturer records 428 comprises information received from the various participating manufacturers. One skilled in the art will appreciate that the storage device 420 and, therefore, consumer data 422, consumer rewards 424, retailer records 426, and manufacturer records 428 may be co-located with the rewards mechanism 402 or may be remotely located with respect to the rewards mechanism 402. If the storage device 420 is remotely located with respect to the rewards mechanism 402, communication between storage device 420 and rewards mechanism 402 may be accomplished by any suitable communication link but is preferably accomplished through a private intranet or extranet.

Enrollment module 412 receives information from consumers, retailers, and/or manufacturers who wish to participate in the system. Enrollment module 412 accesses and stores information in storage device 420. Authentication and/or validation of the identity and status of participants, including any of the other system components, may be performed by the authentication module 414, which preferably has access to the records residing in storage device 420.

Figure 5:
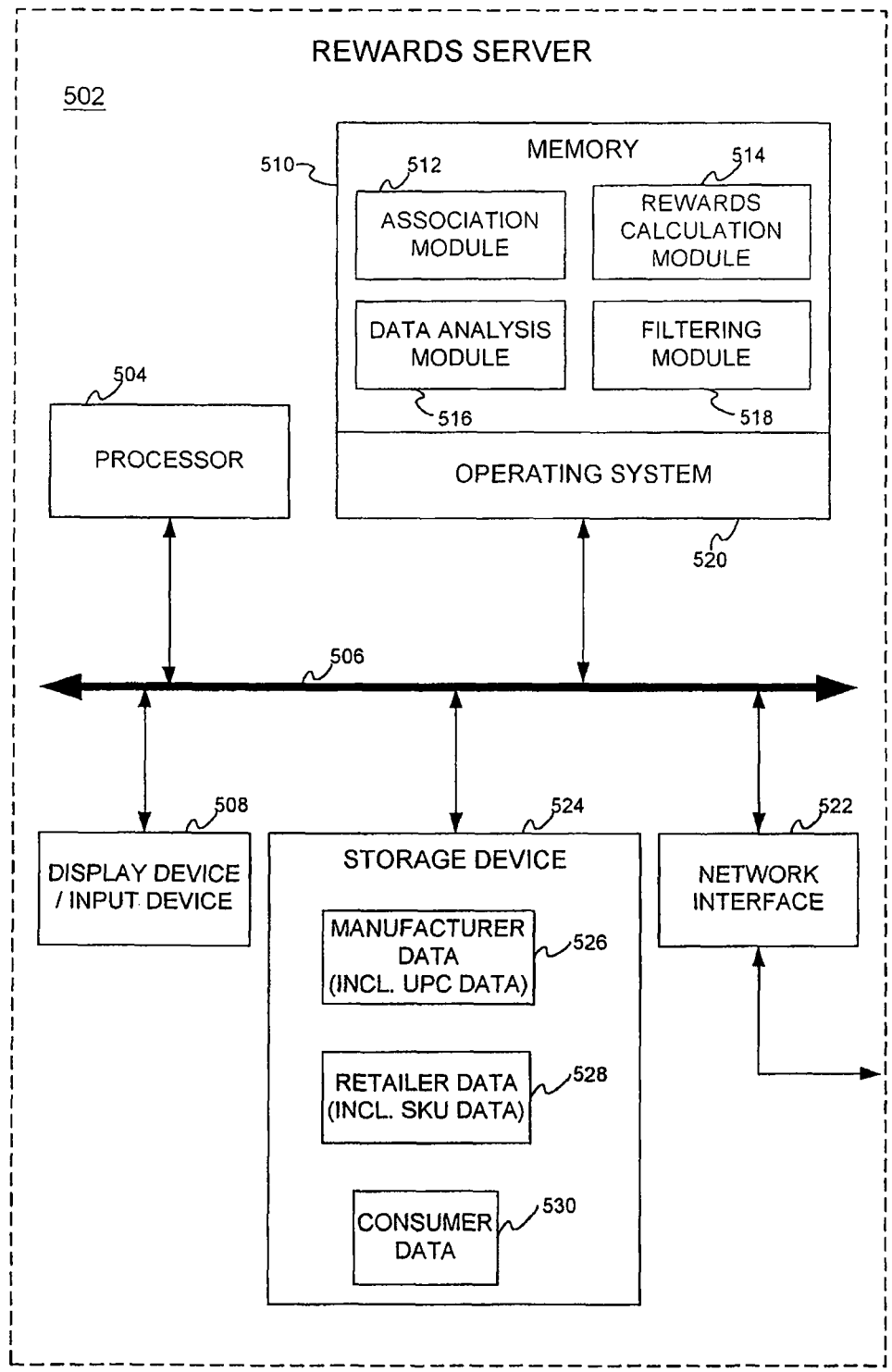
FIG. 5 is a diagram illustrating a rewards server in accordance with various embodiments.

With reference to FIG. 5, an exemplary rewards server 502 includes a central processor 504 in communication with other elements of the rewards server 502 through a system interface or bus 506. A suitable display device/input device 508, such as a keyboard or pointing device in combination with a monitor, may be provided for receiving data from and outputting data to a user of the system. A memory 510 associated with the rewards server 502 includes a variety of software modules, such as an association module 512, a rewards calculation module 514, a data analysis module 516, and a filtering module 518 for example. The memory 510 preferably further includes an operating system 520 which enables execution by processor 504 of the various software applications residing at the various modules 512, 514, 516, and 518. Operating system 520 may be any suitable operating system, as described above. Preferably, a network interface 522 is provided for suitably interfacing with other elements of the incentive awards system, such as the elements described above with reference to FIGS. 1-3.

Lastly, a storage device 524, such as a database as described above for example, preferably contains files or records which are accessed by the various software modules 512, 514, 516, and 518. In particular, manufacturer data 526 comprises information received from a manufacturer, such as descriptions or other information regarding the manufacturer's products and/or services as well as UPC data for example. Retailer data 528 comprises information received from a retailer, such as descriptions or other information regarding the retailer's products and/or services as well as SKU data for example. Consumer data 530 comprises information pertaining to a consumer, including a consumer ID, purchase data, a consumer profile, and/or the like. One skilled in the art will appreciate that the storage device 524 and, therefore, manufacturer data 526, retailer data 528, and consumer data 530 may be co-located with the rewards server 502 or may be remotely located with respect to the rewards server 502. If the storage device 524 is remotely located with respect to the rewards server 502, communication between storage device 524 and rewards server 502 may be accomplished by any suitable communication link but is preferably accomplished through a private intranet or extranet.

Figure 6:
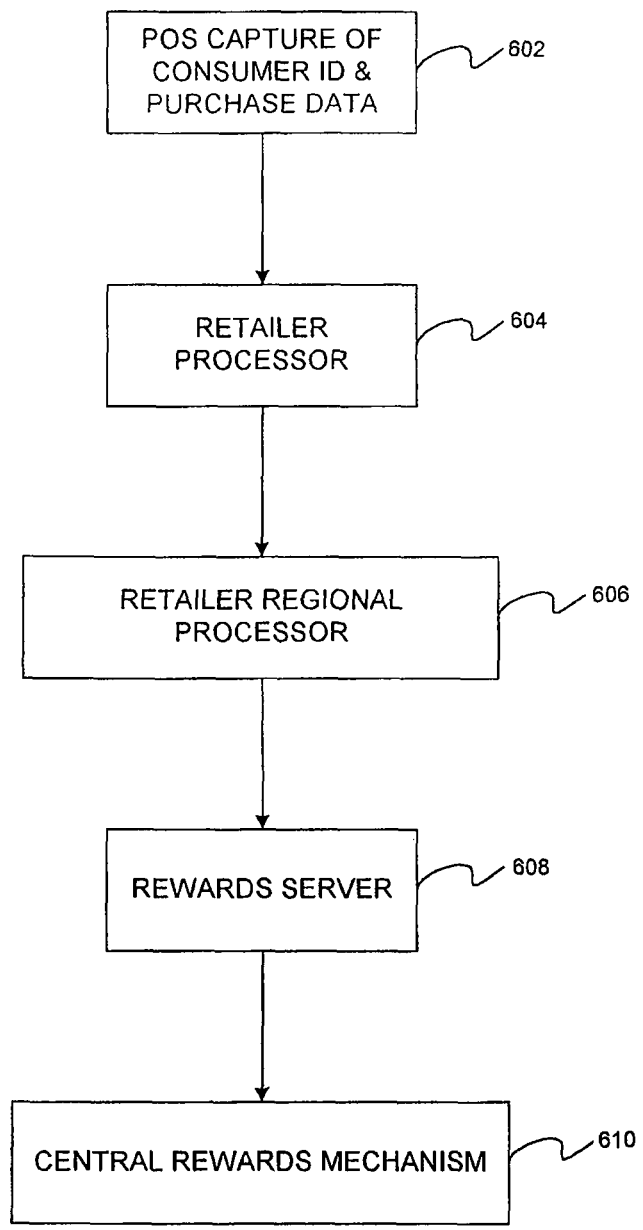
FIG. 6 is a flowchart illustrating capturing and processing POS SKU data in accordance with various embodiments.
Figure 7:
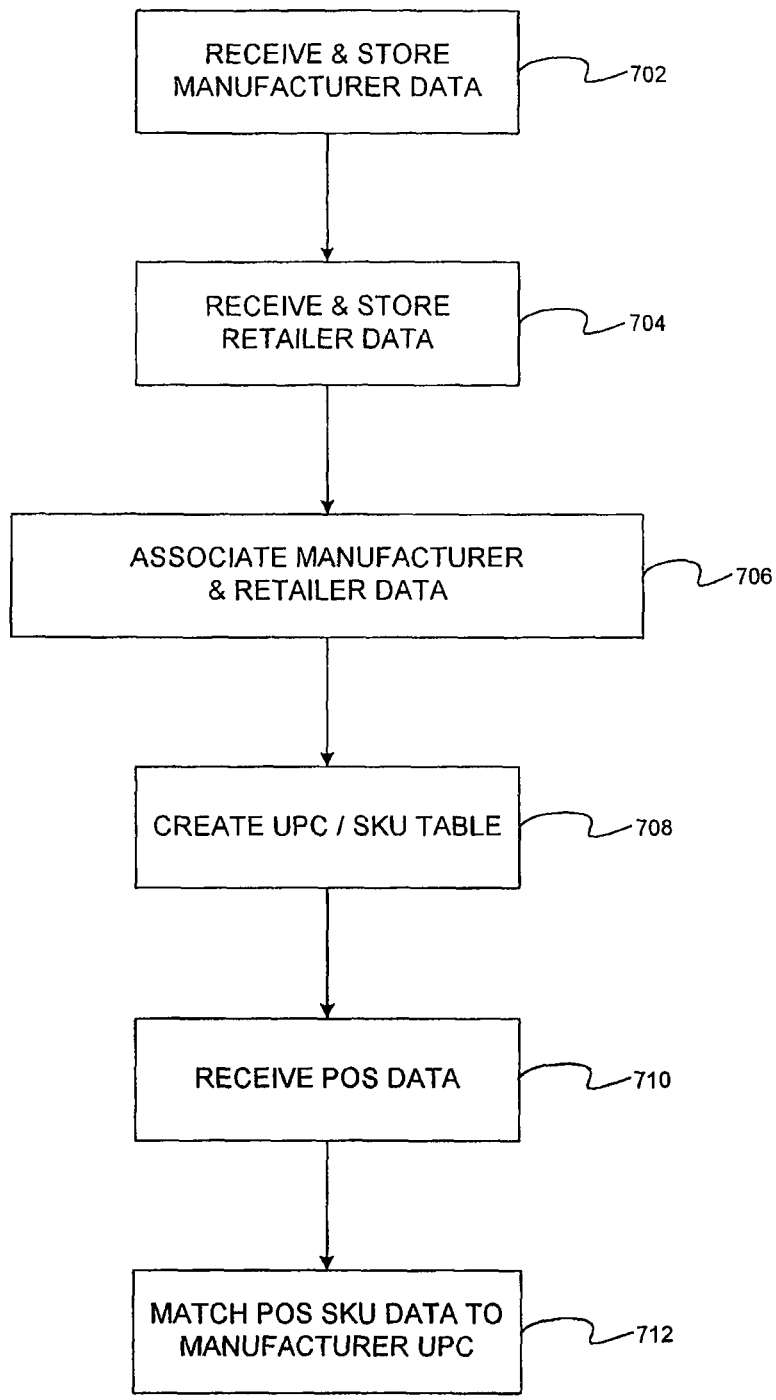
FIG. 7 is a flowchart illustrating associating information in accordance with various embodiments.

Referring next to FIGS. 6 and 7, the process flows depicted in these figures are merely exemplary embodiments of the disclosure and are not intended to limit the scope of the disclosure as described above. It will be appreciated that the following description makes appropriate reference not only to the steps depicted in FIGS. 6 and 7 but also to the various system components as described above with reference to FIGS. 1-3.

FIG. 6 is a flowchart illustrating an exemplary process for capturing and processing POS SKU data in accordance with the present disclosure. The association or matching of UPC and SKU data begins with POS data capture (step 602). When a consumer presents a consumer ID to a retailer 104 at the time of purchasing an item from the retailer 104, the consumer ID is processed by a rewards terminal 116 that recognizes the consumer ID and identifies the consumer as a participant in the system 100. Purchase data is captured by the retailer POS terminal 112. Purchase data may include any of the following: a SKU number; a unit price; a total transaction price; the payment vehicle(s) used; a store ID which identifies the particular store location if a retailer operates more than one store; a department ID, if the store has multiple departments; the date of the transaction; the time of the transaction; the employee ID of the store clerk who facilitates the transaction; a POS terminal ID to identify the particular terminal conducting the transaction; any retailer-specific incentive program ID; and/or the like. The retailer POS terminal 112 creates a transaction file comprising the consumer data (including a consumer ID) and purchase data (including a SKU number associated with each item purchased), and the transaction file is then stored by the retailer processor 110 in database 111 (step 604).

The various transaction files may be consolidated by the retailer processor 110 and then forwarded to the retailer regional processor 114 (step 606) for further back-office and cumulative data analysis performed by retailer 104.

In exemplary embodiments, the transaction file is transmitted by either of the retailer processor 110 or the retailer regional processor 114 to the rewards server 120 (step 608). The SKU information for each item included in the transaction file is then matched to or associated with corresponding UPC information which identifies the related manufacturer 106. An exemplary association process is illustrated in the flowchart of FIG. 7. Association of SKU and UPC data may be accomplished through any data association technique known and practiced in the art. For example, the association may be accomplished either manually or automatically. Automatic association techniques may include, for example, a database search, a database merge, GREP, AGREP, SQL, and/or the like.

In various exemplary embodiments, database 121 receives and stores manufacturer data, including UPC data, from manufacturer 106 (step 702). Database 121 also receives and stores retailer data, including SKU numbers, from retailer 104 (step 704). In an exemplary implementation, database 121 stores manufacturer data in a separate manufacturer data table for each participating manufacturer 106. Each manufacturer data table may comprise a plurality of fields, such as "UPC" and "product description" for example, and a plurality of records, each of which corresponds to an item offered by the participating manufacturer 106. In various embodiments, database 121 stores retailer data in a separate retailer data table for each participating retailer 104. Each retailer data table may comprise a plurality of fields, such as "SKU" and "product description" for example, and a plurality of records, each record corresponding to an item offered by a participating retailer 104.

Data from each of the manufacturer and the retailer data tables is then associated (step 706). The association step may be accomplished by a database merge function, for example, using a "key field" in each of the manufacturer and retailer data tables. A "key field" partitions the database according to the high-level class of objects defined by the key field. For example, a "product description" class may be designated as a key field in both the manufacturer data table and the retailer data table, and the two data tables may then be merged on the basis of the "product description" data in the key field. In alternate embodiments, the data corresponding to the key field in each of the merged data tables is preferably the same. That is, the product descriptions in the manufacturer data table matches the product descriptions in the retailer data table. However, manufacturer and retailer data tables having similar, though not identical, data in the key fields may also be merged by using AGREP, for example.

The result of the data association step is the creation of a separate data table, such as a UPC/SKU lookup table for example (step 708). Thus, when the rewards server 120 receives the data (e.g., consumer ID and SKU data) captured by the POS terminal (step 710), the rewards server 120 may search the UPC/SKU lookup table for the appropriate SKU number and then match the SKU to the corresponding UPC data (step 712). In various exemplary embodiments, the "SKU" and "UPC" fields in the UPC/SKU data table may be linked by an appropriate pointer. That is, when the rewards server 120 searches the UPC/SKU table and locates the particular SKU that has been captured and transmitted by the POS terminal, the specifically identified SKU datafield uses a pointer to direct the rewards server 120 to the UPC datafield that corresponds to that SKU number. In various exemplary embodiments, the UPC datafield may be linked by one or more additional pointers to other key fields, such as a consumer ID, a retailer ID, a manufacturer ID, and/or a third-party ID. These additional pointers may be used as means for compiling data which may be useful in any of the various data analyses performed by the rewards server 120. In this manner, the association of POS SKU numbers and UPC data may be used to create a context in which standardized, network-wide analyses may be conducted.

In exemplary embodiments, the rewards server 120 utilizes the association information to calculate the rewards points generated by a consumer's purchase. For example, an appropriate series of pointers leading from a SKU to a UPC to a manufacturer ID may ultimately direct the rewards server 120 to employ a 2-for-1 manufacturer rewards ratio to award a consumer twice as many points as the dollar amount of the consumer's total transaction price. In other exemplary embodiments, an appropriate series of pointers may result in the calculation of rewards points based upon multiple rewards criteria, such as rewards criteria associated with the manufacturer of the item as well as rewards criteria associated with a third-party provider for example.

In further embodiments, the rewards server 120 may use the association of UPC and SKU number data to analyze a variety of marketing variables across multiple manufacturers and retailers. For example, rewards server 120 may use a series of pointers leading from an SKU to a UPC and then to a "consumer profile" field or table to correlate, for instance, consumer spending behaviors, particular manufacturers, and/or specific products across multiple retailers for example.

In alternative embodiments, association of the UPC data and SKU number may take place at any of the rewards terminal 116, the retailer POS terminal 112, the retailer processor 110, the retailer regional processor 114 (or a retailer national processor), and/or the central rewards mechanism 102.

In various embodiments, the retailer 104 may offer an incentive or loyalty program that is independent from the program offered by the system 100. Alternatively, the retailer 104 may use the system's UPC data for its own internal purposes.

With momentary reference to FIG. 6, in various exemplary embodiments, the consumer ID and the earned rewards information are transmitted to the central rewards mechanism 102 after the rewards server 120 has filtered out consumer data associated with the consumer ID (step 610). In other embodiments, the central rewards mechanism 102 may use the captured and matched UPC information to determine rewards and/or for data analysis.

Consumers may utilize computing devices to assist in the purchase and/or loyalty process, and in particular, the consumer may utilize a PDA to facilitate the purchase and/or loyalty process. During the purchase and/or loyalty process, the third-party provider or consumer may want to insure that any content downloaded or used in association with the PDA is secure in how it is collected, assembled, and delivered to the PDA device. In various exemplary embodiments, the PDA may have direct access to an Internet web site portal that offers secure personal content from a content provider, such as, for example, an on-line banking or financial institution. Using the web site portal, the content provider may offer personal or confidential data, such as financial information, to PDA users in a secure (e.g., encrypted) manner. The exemplary system and method may establish a PDA portal link to the web site for collecting specified information for a user and transmitting the information to the remote device. The information from the web site is retrieved using a secure open network protocol, such as SSL 3.0. The retrieved information is encrypted within a tamper resistant hardware encryption device (HED) and can be re-encrypted using the same HED and a user specific pass-phrase. The resulting secure information is downloaded to the PDA to be stored encrypted with the pass-phrase. When the PDA user wants to view the secure information, the user enters the pass-phrase, which will be used to decrypt the secure information. After a preset amount of time, the un-encrypted information is deleted from the PDA, which may require the user to enter the pass-phrase again. To receive secure information, the PDA facilitates contact with the portal and the establishment of a connection, authenticates itself to the network, and facilitates complete secured transactions or transmissions over the network.

This approach substantially secures the contest (or a portion of the content) from its source channel to the PDA. The exposure or visibility of the personal content in an unsecured state is essentially eliminated or minimized. The phrase "end to end" is often used to described when content is substantially secure from its source to when it is used. It is desirable to expand this concept for PDAs because much of the time they are used in a disconnected fashion. Being disconnected, the content is physically stored on the PDA and can be accessed multiple times. So once the connection to the network has been broken, the content should continue to be secure against improper use. Therefore it is helpful if the content can be secured while on the PDA and be viewable after the user has properly authenticated himself. The content, or any portion thereof, may be secured at any point or segment along the transmission or storage or all points along the process depending on the needs of the system.

Providing content security between multiple layers of a system usually includes each pair of communicating components negotiating the method used for securing any interchange between them. Each step could use a different method for encrypting the content and producing a challenge for securing an environment, because data will be in "the clear" (e.g., not encrypted) at intermediary points along the communication path. However, since the content being collected by be in "the clear" while inside a tamper resistant, programmable cryptographic module, e.g., the HED, the data is substantially secure from eavesdropping and direct attacks on the hardware in which the data is in "the clear". The data can be secured using a standard algorithm using a pass-phrase established by the user. This pass-phrase can serve to authenticate the user when viewing content on the PDA. Moreover, the standard protocols used by the Internet are not necessarily trivial in the resources that are used to decrypt the content. As such, a standard algorithm may be used for encrypting the content to be placed onto the PDA. This is so because standard protocols have had rigorous analyses to verify and decrypt the content, for example, without using a pass-phrase or the Triple Data Encryption Standard (3DES) key.

An exemplary system and method of the present disclosure secures the data from its source to when it is actually viewed or used by the authorized user. It can use methods for securing the content that are appropriate for the environment being used. For example, to collect the content from the source channels, standard internet methods (SSL) may be used. However, since some PDAs are limited in their processing capabilities, a different method, requiring less resources, of securing the data on the device can be used (e.g., ECC).

Once this content and the mechanism to push it onto the PDA are available, all types of personal content can be placed onto the customer's PDA for their off-line use. This could include their travel itineraries, monthly account statements, investment portfolio, and or the like. This enables personal content to be securely distributed to the customer's PDAs, thereby placing content onto a device that can be connected or disconnected. In addition, how the content is used will increase the value of the content that content providers make available.

As more fully described in FIGS. 8-11, PDA portal registration, establishing a secure session, PDA updates, and the like are illustrated in accordance with various exemplary embodiments of the present disclosure.

Figure 8:
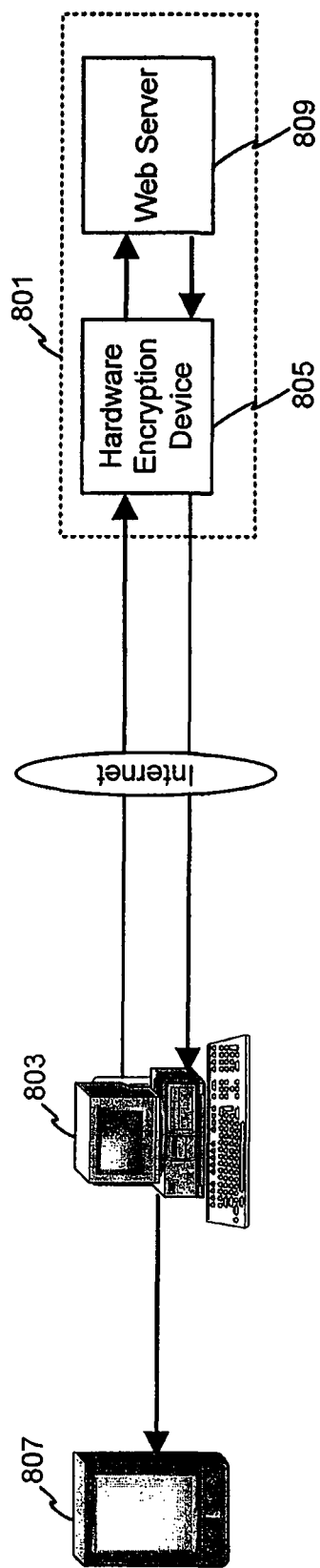
FIG. 8 is a schematic block diagram illustrating a PDA portal registration process and system in accordance with various embodiments.

In various embodiments, FIG. 8 illustrates PDA portal registration where a user connects to a PDA portal 801 web site from a desktop browser 803, using a secure open systems transport protocol such as SSL 3.0. The user indicates that selected content be refreshed (synching a PDA 807) and PDA 807 facilitates a connection to PDA portal 801. In exemplary embodiments of the present disclosure, the user need not provide her user ID and password for each secure channel each time PDA 807 is synched. In this manner, the session for PDA 807 may have a different expiration rate (e.g., than the about 10 minutes used for wired Internet use).

For example, the user registers that certain selected content can be downloaded to PDA 807 during a synchronization event. The user selects content from secure web sites or channels and provides a user ID and password (e.g., a PDA Portal management user ID and password). The user provides a PDA security pass-phrase, which normally includes a string of numbers and characters. The user ID and password can be used later to authenticate the user prior to maintaining the user's PDA portal information. The pass-phrase is used with the encryption mechanism used to protect the content during transmission and storage on PDA 807 at the later synchronization event.

PDA 807 may connect to a PDA portal web server 809 by, for example, PDA 807 and/or desktop browser 803 communicating with PDA portal 801 via the Internet. After connecting, the user enrolls in the PDA portal service and establishes an account including selection of channels to be collected during each synching request. PDA portal 801 then identifies the user and interrogates the channels she has selected. For example, a pass-phrase may be used when accessing secure channels. The user may enter the pass-phrase on a form on desktop browser 803, encrypt the pass-phrase using, e.g., SSL 3.0, and forward the pass-phrase to PDA portal 801. If one (or more) of the channels includes secure content, the PDA portal connects to the source channel and collects the desired content. For example, optionally, establishing sessions with secure channels can be executed from desktop browser 803, rather than PDA 807. Establishing sessions can include establishing an initial session, a new session, or renewing an expired session.

The user can use any appropriate device to register with PDA portal 801, including PDA 807 or desktop browser 803 (e.g., a personal computer). The content to be downloaded may include secure services (e.g., where the user already has a relationship with a third-party provider by a prior enrollment) or new secure services (e.g., where the user does not already have an existing relationship with the third party provider). If a new service is being requested for a PDA download, the user can separately register for that service through the normal web site registration process for the service and provide a user ID and password for access to the secure service. Secure services selected by the user can include incentive programs, such as frequent flyer services or redemption and shopping services. Other information that may be entered at registration includes demographic information, such as name and address and key information, such as an account number for later use when retrieving data from the secure service. In the event that a user forgets their PDA portal user ID or password, the previously saved pass-phrase or user demographic information can be used to verify the user during a secure conversation between desktop browser 803 and PDA portal 801. After the user has been verified, PDA portal 801 can provide the user with their forgotten user ID or allow the user to change their password. In alternate embodiments, instead of a separate user ID and password, the pass-phrase could also be used to authenticate the user prior to maintaining their PDA portal information.

Instead of connecting directly to the course, PDA portal 801 can connect to a hardware encryption device (HED) 805 with the request. HED 805 intercepts the response, decrypts the SSL 3.0 pass-phrase, and stores the pass-phrase on HED 805. For each secure channel selected, the user may provide key information needed to access the pertinent content from that channel (e.g., an account number). Such data or information is entered onto a form on PDA 807, encrypted using, for example, SSL 3.0 following a key exchange with PDA portal 801 terminated within HED 805, and forwarded to PDA portal 801. HED 805 can decrypt the SSL traffic, extract the name value pairs, encrypt the value using a 3DES key, e.g., known only to HED 805. HED 805 can then pass the URI (Uniform Resource Identifier), including the name value pairs, but with the value replaced with the 3DES encrypted value, to PDA portal 801. PDA portal 801 stores the key information in a database or file. The pass-phrase can be stored securely by storing it directly on HED 805, encrypting it on HED 805, or using a key (e.g., 3DES) known to HED 805 and encrypting the pass-phrase within HED 805 and storing the pass-phrase external to HED 805 (e.g., in a database or file).

When PDA 807 synchronizes for the first time, PDA portal 801 may not recognize the account being required. The user can identify themselves by entering their user ID and password or pass-phrase on PDA 807. PDA portal 801 can associate this identifier with the user's profile (e.g., kept locally to PDA portal 801). The initial synchronization uses a secure open network transport protocol (e.g., SSL 3.0), because HED 805 identifies the user before the pass-phrase can be used for encryption between PDA 807 and HED 805.

Since the encryption device is secure, there is no need to store the pass-phrase in an encrypted form. HED 805 connects to the channel source using a secure connection where the encryption key is negotiated between the two parties. The channel source content is prepared and returned to HED 805 in an encrypted form. For each secure channel selected, the user may provide the key information needed to access the relevant content from that channel (e.g., an account number). Such data or information is entered onto a form, encrypted using, for example, SSL 3.0 following a key exchange with PDA portal 801 (e.g., HED 805), and forwarded to PDA portal 801. Key information need not be visible to PDA portal 801, even though such key information may be housed in the PDA portal 801 environment. HED 805 intercepts the request and decrypts the content. The key information is stored on HED 805 in an unencrypted state (since HED 805 is a secure device) for that PDA portal 801 account. However, before forwarding the content to PDA portal 801 for further processing, HED 805 interrogates the content. As HED 805 interrogates the content, any imbedded links can be isolated. The resulting content can then be re-encrypted using a standardized algorithm (such as, for example, ECC) using the encryption key (pass-phrase) that has been established by the user. The encrypted content as well as the "in the clear" links will then be returned to PDA portal 801 for continued processing.

The content will then be forwarded to PDA 807 for storing either piecemeal as the collection of each channel is completed, or as a whole once all the content has been collected. As such, once the set-up has completed, the appropriate PDA portal 801 account and connection information is stored in a user profile at PDA portal 801 and on PDA 807. The content is then sent to PDA 807 in the same form it had been received by PDA portal 801 from the channel (for non-secure content) or HED 805 (secure content). When the user desires to view the secure content, PDA 807 requests that the user authenticate himself by entering his pass-phrase, which will be used to facilitate decrypting the content. The authentication may exist each time the user tries to access this content, as the content will continue to be stored in an encrypted state on PDA 807.

In accordance with various exemplary embodiments of the present disclosure, the system and method utilizes HED 805 as a filter as the content is streamed into PDA portal 801. The content will be decrypted from the standard internet interaction, and re-encrypted using a standard algorithm. This re-encryption may be applied to only the content, not any links that are included. This allows the link to be visible to the portal function to request the additional content pages.

Since PDA portal 801 serves as a collection point, it is equally important to insure the content is secured as it is being collected and aggregated with content from other channel sources. This disclosure may secure the content itself while exposing any links for additional data collection. In this way, the exposure of secure data is minimized outside the source, HED 805, or when viewed by the authenticated user.

Figure 9:
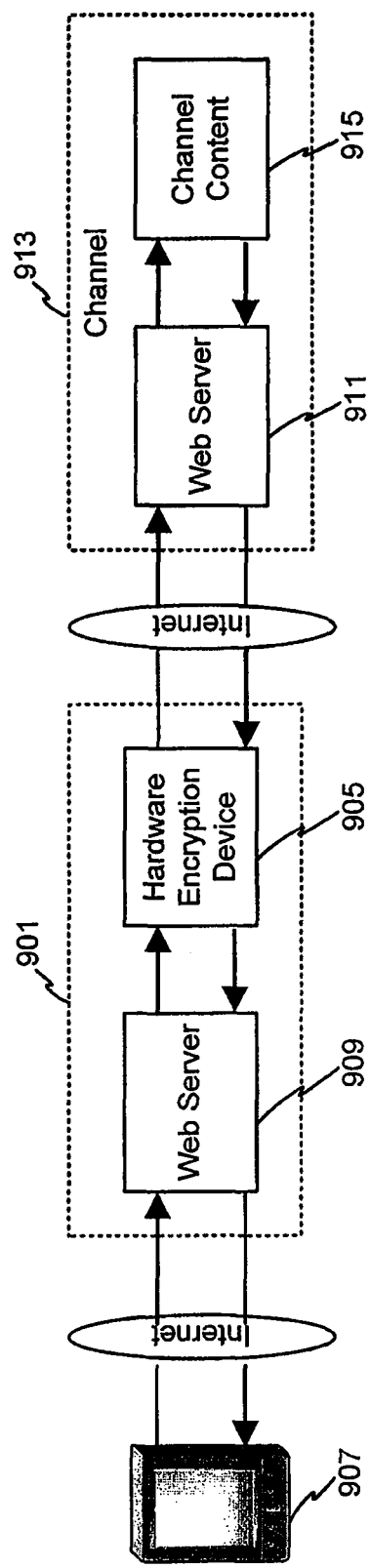
FIG. 9 is a schematic block diagram illustrating an exemplary process and system for establishing a session for secure content using a PDA portal in accordance with various aspects of the present disclosure.

FIG. 9 illustrates a PDA portal 901 establishing a session for secure content in accordance with various exemplary embodiments of the present disclosure. The user indicates that a PDA 907 is to sync with PDA portal 901 to refresh the content for the subscribed channels (e.g., subscribed content). PDA 907 connects to a PDA portal web server 909. For example, PDA 907 may use the Internet to connect to PDA portal 901. PDA portal web server 909 interrogates the channels to be refreshed for the request (e.g., interrogates the secured content to be refreshed) from either PDA 907 or from a database or file connected to PDA portal 901. If secure content (e.g., from a credit card company) is desired, PDA portal 901 returns to PDA 907 for the session cookie for each secure channel. If secure content is desired, PDA portal 901 requests the previously encrypted session ID from a database or file system local to PDA portal 901. For example, PDA portal 901 can use a HED 905 to encrypt the session ID with 3DES key generated internal to HED 905. The session cookie includes a session identifier identification (e.g., session ID). The session ID for each secure channel is requested from PDA 907. The session ID is encrypted with the user's pass-phrase or with a different key (such as, a 3DES key), e.g., only known to HED 905.

Establishing session can include establishing an initial session, a new session, or renewing an expired session. If a session cookie does not exist, processing continues where HED 905 at PDA portal 901 intercepts a pass-phrase, decrypts the SSL 3.0 pass-phrase, and stores the pass-phrase on HED 905. Since HED 905 is secure, there is no need to store the pass-phrase in an encrypted state. In various exemplary embodiments of the present disclosure, the secure content on HED 905 is visible after the user enters his or her pass-phrase. If the session cookie does not exist, PDA portal 901 requests PDA 907 to prompt the user to enter their user ID and password for the subscribed channel, e.g., secure content (each channel or secure site can have a different user ID and password pair). For example, PDA 907 encrypts the user ID and password using ECC with the pass-phrase provided by the user. The pass-phrase for the user can be entered on PDA 907 during the user ID and password sync event, since the pass-phrase is not stored on PDA 907. The pass-phrase for the user is stored on HED 905.

The encrypted user ID and password is returned to PDA portal web server 909, and PDA portal web server 909 forwards the request to HED 905. In various exemplary embodiments, PDA portal web server 909 does not have access to the user ID and password, the pass-phrase, and the session cookie (which may not be encrypted). HED 905 decrypts the user ID and password using ECC and the pass-phrase for the user account. The pass-phrase used for decryption of the user ID and password was previously stored at web server 909 using HED 905 as described in connection with FIG. 8. HED 905 encrypts the request using SSL 3.0 following a key exchange with a channel web server 911 of a channel 913. For example, HED 905 may communicate with channel web server 911 via the Internet. If the user ID and password is successfully decrypted (because the pass-phrase delivered from PDA 907 is the same as the pass-phrase previously provided during registration), then HED 905 re-encrypts the user ID and password using a standard secure internet transport protocol, such as SSL 3.0, following a key exchange with channel web server 911 to provide secure content. The encrypted session request is directed to channel web server 911, and channel web server 911 decrypts the user ID and password, verifies the user ID and password pair, and establishes a session. The encrypted authentication request is directed to channel web server 911. Channel web server 911 decrypts the user ID and password, verifies the user ID and password pair, and establishes a session, e.g., by issuing a session ID with an HTTP cookie (e.g., a session cookie). Accordingly the security of PDA portal 901 can be enhanced because the user ID and password was not "in the clear" (e.g., outside HED 905). In this manner, if a hacker gained access to PDA portal 901, the hacker could not learn the user ID and password by monitoring traffic at PDA portal 901. Channel content 915 communicates with channel web server 911 to serve the requested content and return it to channel web server 911.

An encrypted session cookie is returned to HED 905, and HED 905 decrypts the SSL 3.0 session cookie and encrypts the session cookie with ECC. The encryption of the session cookie with ECC uses the user pass-phrase as the key. The credentials are hashed with a random number and salted. The encrypted session cookie is returned to PDA portal web server 909, directed to PDA 907, and stored on PDA 907 in its encrypted form. As the session cookie is received, PDA 907 facilitates registration of the secure channel which the session cookie is to be used with.

Once the session cookie has been established, the normal method for refreshing the content for the selected channels is executed. Accordingly, HED 905 at PDA portal 901 intercepts a pass-phrase, decrypts the SSL 3.0 pass-phrase, and stores the pass-phrase on HED 905. Since HED 905 is secure, there is no need to store the pass-phrase in an encrypted state. Expiration of the session cookie will be configurable. These types of session cookies need not expire every ten minutes; rather, such session cookies could have a duration of several months.

In alternate embodiments of the present disclosure, PDA portal 901 requests PDA 907 to prompt the user to enter his user ID and password for the subscribed secure content. PDA portal 901 uses a secure open network transport protocol, such as SSL 3.0, to transmit the user ID and password from PDA 907 to HED 905 as the end point for the SSL 3.0 transmission. HED 905 re-encrypts the user ID and password using a standard secure internet transport protocol, such as SSL 3.0, following a key exchange with channel web server 911 to provide secure content. The encrypted authentication request is directed to channel web server 911. Channel web server 911 decrypts the user ID and password, verifies the user ID and password pair, and establishes a session, e.g., by issuing a session ID within an HTTP cookie (e.g., a session cookie). Accordingly, the security of PDA portal 901 can be enhanced because the user ID and password was not "in the clear" (e.g., outside HED 905).

In alternate embodiments of the present disclosure, HED 905 can encrypt the session ID with the pass-phrase and return the result to PDA portal 901, which can be transmitted to PDA 907 for storage as the session ID for the associated secure content or channel.

In other alternate embodiments, the session ID can be stored locally to PDA portal 901 and protected with a 3DES key along with a salt. Using HED 905, a hash of the session ID with the stored salt using a hashing algorithm such as SHA-1, as described in "Applied Cryptography: Protocols, Algorithms, and Source Code in C", supra, can be completed. The hashed session ID can be provided to PDA portal 901 to be transmitted to PDA 907 for storage associated with the appropriate secure content or channel.

Once the session ID has been established and stored, synchronizing the content for the selected secured web sites is executed. Accordingly, PDA 907 sends a Universal Resource Identifier (URI) to PDA portal 901 requesting the secure content. Depending on the security desired for the URI request, the URI request can be transmitted (e.g., unencrypted), encrypted using an open networks transport protocol (such as SSL 3.0), or encrypted using a user-entered pass-phrase and an encryption algorithm such as ECC. If the URI is encrypted using the user pass-phrase, PDA portal 901 can request HED 905 to decrypt the URI, e.g., using the previously stored user pass-phrase. PDA portal 901 supplies the URI, the previously encrypted (e.g. 3DES) and saved session ID, and any desired encrypted (e.g. 3DES) and saved key information to HED 905. The key information can be provided to HED 905 as a name value pair, e.g., with the key date encrypted. HED 905 decrypts the session ID and the key information. The actual URI request is built by filling in name value pairs with the decrypted value and building the session cookie.

In other alternate embodiments, if the session ID was previously encrypted using the pass-phrase and returned to PDA 907 for storage, the encrypted session ID can be forwarded to PDA portal 901 (e.g., typically as a session cookie associated with the relevant URI). In such a case, PDA portal 901 forwards the URI request, the user ID, and the encrypted session cookie to HED 905. HED 905 decrypts the session cookie associated with this user ID using the pass-phrase.

In other embodiments, if a salted and hashed session ID was previously stored on PDA 907, the salted and hashed session ID can be forwarded with the URI request to PDA portal 901. PDA portal 901 forwards the URI request, the related user ID, the locally encrypted (e.g. 3DES) and stored session ID, and the salted and hashed session ID returned from PDA 907 to HED 905. HED 905 decrypts the session ID previously locally stored and salts and hashes the result. If the newly created value matches the salted and hashed value returned from PDA 907, then the hashed session ID previously sent to PDA 907 is the same one that was returned without exposing the actual session ID to exposure from theft from PDA 907.

HED 905 negotiates a secure open network transport protocol, terminating in HED 905, with the secure content web site. In alternate embodiments, the transport protocol is decrypted within HED 905, and re-encrypted using the user pass-phrase. The re-encrypted content is transmitted to PDA 907 directly from HED 905 or by PDA portal 901, if PDA portal 901 is used as an intermediary for PDA 907. HED 905 extracts links from the current secure page and provides the links back to PDA portal 901. As such, HED 905 determines (e.g., based on its synchronization rules), if that additional content should be synchronized to PDA 907.

In a less secure environment, PDA Portal 901 receives the returned secure content and passes that content to HED 905. HED 905 encrypts the content using the user pass-phrase and transmits the secure content to PDA 907 or by PDA portal 901, if PDA portal 901 is used as an intermediary for PDA 907. In such various embodiments, PDA portal 901 requests any additional links within the current page based on its synchronization rules.

If the fetch of the secure content fails, because the secure web site has expired the session, for example, PDA 907 can be challenged to enter the secure web site user ID and password again (e.g., as described above in connection with when the session did not exist). The content is forwarded to PDA 907 for storage (either piecemeal as the collection of each channel is completed or the encrypted content will be saved on PDA portal 901 and forwarded to PDA 907 as a whole) once all the content has been collected. PDA 907 accepts content until PDA portal 901 signals the synchronization event is over. When the user desires to view the secure content, PDA 907 requests that the user authenticate himself by entering his pass-phrase, which is used to decrypt the content. The unencrypted content exists on PDA 907 for a predetermined amount of time, after which it can automatically be deleted. The predetermined time is determined by the user profile stored at PDA portal 901. To view the content again, the user may enter the pass-phrase again. After using the pass-phrase, the pass-phrase can be purged from PDA 907. If the user removes the channel with secure content or logs out, for example, the secure content and associated session cookie are deleted from PDA's 907 storage. At the next synch, PDA portal 901 is notified and the channel is removed from the user's profile.

Thus, FIG. 9 illustrates establishing a PDA portal session for secure content in accordance with various exemplary embodiments.

Figure 10:
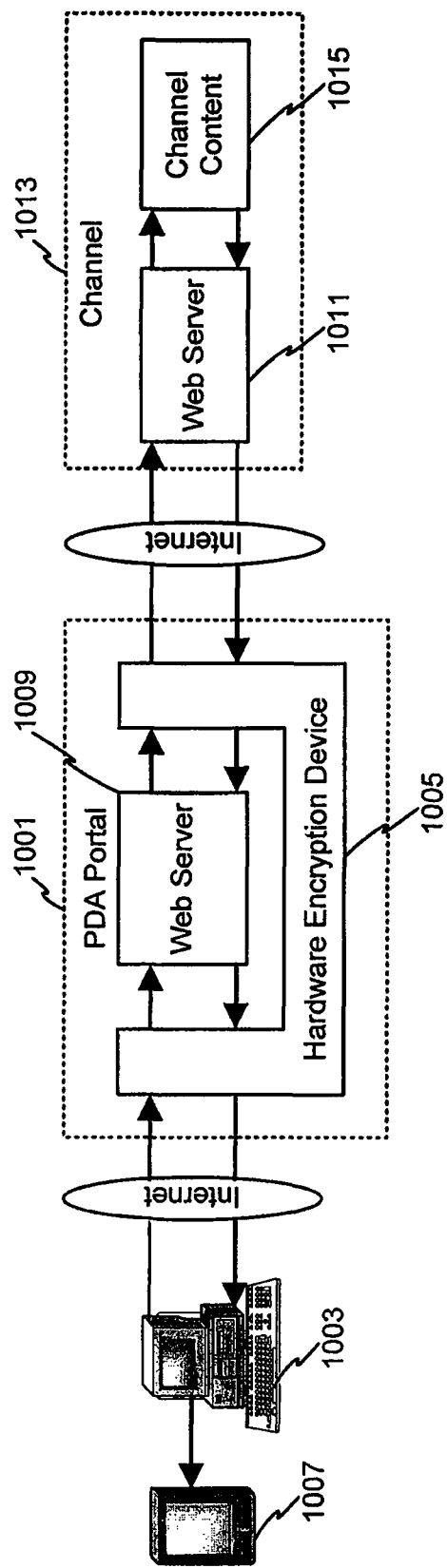
FIG. 10 is a schematic block diagram illustrating an exemplary process and system for registration and establishing a session for secure content using a PDA portal in accordance with various aspects of the present disclosure.

FIG. 10 illustrates a PDA portal registration and establishing a session in accordance with various exemplary embodiments of the present disclosure. The user goes to a PDA portal 1001 web site from their desktop web browser 1003. For example, a PDA 1007 and/or desktop browser 1003 may communicate with a PDA portal 1001 via PDA Portal web server 1009 (e.g., via Internet). The user enrolls in the PDA portal service and establishes an account including selection of channels to be collected during each sync request. For example, the pass-phrase used when accessing secure channels must be entered on a form on desktop web browser 1003, encrypted using SSL 3.0, and forwarded to PDA portal 1001. At PDA portal 1001, an HED 1005 intercepts the pass-phrase form, decrypts the SSL 3.0 pass-phrase, and stores the pass-phrase on HED 1005. Since HED 1005 is secure, there is no need to store the pass-phrase in an encrypted state.

For each secure channel that is selected, the user provides key information needed to access the pertinent content from the channel (e.g., an account number). Additionally, since these channels are secure, each secure channel will require the definition of the user ID and password for accessing the account, for example. This data is entered onto a form and encrypted using SSL 3.0 following a key exchange with PDA portal 1005 (e.g., with HED 1005). HED 1005 intercepts the request and decrypts the content. The key information is stored on HED 1005 in an unencrypted state (because HED 1005 is a secure device) for that PDA portal account. The user ID and password for the channel is not stored. Instead, the user ID and password is encrypted using, for example, SSL 3.0 following a key exchange with a channel web server 1011 of a channel 1013. For example, HED 1005 may communicate with channel web server 1011 via the Internet. Channel content 1015 communicates with channel web server 1011 to serve the requested content and return it to channel web server 1011.

The encrypted user ID and password request is forwarded to channel web server 1011. Channel web server 1011 decrypts the user ID and password, verifies the user ID and password pair, and establishes a session. The session ID for the session is encrypted using SSL 3.0 and the negotiated keys. The encrypted session cookie is returned to HED 1005. HED 1005 decrypts the SSL 3.0 session cookie and encrypts the session cookie with ECC using the user pass-phrase as the key. Additionally, the credentials are hashed with a random number and salted.

The encrypted session cookie is directed to PDA 1007 and stored on PDA 1007 in its encrypted form. As the encrypted session cookie is received, PDA 1007 will register which secure channel the encrypted session cookie is to be used with. Once the set-up has completed, the appropriate PDA portal account and connection information is stored in the user profile at PDA portal 1001 and on PDA 1007. Expiration of the session cookie will be configurable. These types of session cookies need not expire every ten minutes; rather, such session cookies could have a duration of several months, for example. Thus, FIG. 10 illustrates a PDA portal registration and establishing a session in accordance with various exemplary embodiments.

Figure 11:
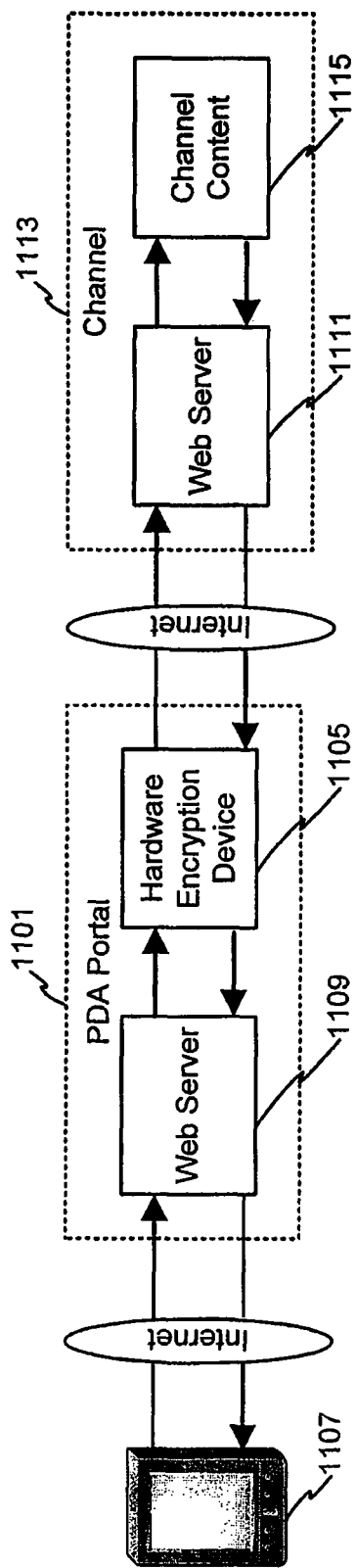
FIG. 11 is a schematic block diagram illustrating systems and processes for exemplary PDA updates using a PDA portal in accordance with various aspects of the present disclosure.

FIG. 11 illustrates a PDA portal channel update in accordance with various exemplary embodiments of the present disclosure. The user indicates that a PDA 1107 is to sync with a PDA portal 1101 to refresh the content for their subscribed channels. PDA 1107 connects to PDA portal 1011 via a PDA portal web server 1109. For example, a PDA 1107 may communicate with PDA portal 1001 via the Internet. PDA portal web server 1109 interrogates the channels to be refreshed for the request. If secure content is desired, PDA portal 1101 returns to PDA 1107 for the session cookie for each secure channel. If a session cookie does not exist, processing continues for establishing a session in accordance with FIG. 10 for example.

The existing session cookie on PDA 1107 is returned to PDA portal 1101 in its encrypted form. The session cookie along with the PDA portal user account is forwarded to an HED 1105. HED 1105 does not need to be encrypted as there is no secure content present. HED 1105 decrypts the session cookie using ECC and the pass-phrase for the user account. The user account is stored on PDA 1107 in accordance with FIGS. 8 and 10. The key information used to access the desired channel content is combined with the session cookie into a request. HED 1105 encrypts the request using SSL 3.0 following a key exchange with a channel web server 1111 of a channel 1113. For example, HED 1105 may communicate with channel web server 1111 via the Internet. The encrypted session request is directed to channel web server 1111, and channel web server 1111 decrypts the encrypted request and verifies the session ID contained within the cookie. Channel content 1115 communicates with channel web server 1111 to serve the requested content and return it to channel web server 1111.

If the session ID is current and valid, channel web server 1111 passes the key information to the applicable channel content for fulfillment. If the session ID is invalid or expired, an error is returned to PDA portal 1101 and the user can re-establish their session cookie in accordance with FIG. 10 for example. Once the content has been collected, it is returned to channel web server 1111. Channel web server 1111 encrypts the response (referred to as the payload) using SSL 3.0 using the negotiated keys. Channel web server 1111 returns the encrypted response to HED 1105 at PDA portal 1101.

HED 1105 decrypts the response and interrogates the content, identifying any links that are present. The remaining content is then encrypted with ECC using the pass-phrase that has been established for this user account as the key. The credentials are hashed with a random number and salted.

The encrypted content passes to PDA portal web server 1109. For any links present in the response, for example, PDA portal web server 1109 submits additional requests to the channel until all content is collected as described above. Once all content (either secure or unsecured) is collected, it is returned to PDA 1107 and stored. To view the contents on PDA 1107, the user authenticates themselves. Authentication is completed by entering the user's pass-phrase, which is used to decrypt the content and make it available for viewing.

Once the content is decrypted and viewed, the content is purged from PDA's 1107 memory after a defined period of time. After entering the pass-phrase, the pass-phrase is purged from PDA's 1107 memory after a defined period of time. The purging and defined period of time are configurable depending on the needs of the system. If the user removes the channel with secure content or logs out, for example, the secure content and associated session cookie are deleted from PDA's 1107 storage. Thus, FIG. 11 illustrates channel updates in accordance with various exemplary embodiments of the present disclosure.

In the foregoing specification, the disclosure has been described with reference to specific embodiments. However, it will be appreciated that various modifications and changes can be made without departing from the scope of the present disclosure as set forth in the claims below. The specification and figures are to be regarded in an illustrative manner, rather than a restrictive one, and all such modifications are intended to be included within the scope of present disclosure. Accordingly, the scope of the disclosure should be determined by the appended claims and their legal equivalents, rather than by the examples given above. For example, the steps recited in any of the method or process claims may be executed in any order and are not limited to the order presented in the claims.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the disclosure unless expressly described as "essential" or "critical".

We claim:

1. A hardware portal, comprising:
   at least one processor; and
   memory having program instructions stored thereon that, responsive to execution by the at least one processor, cause the hardware portal to:
   receive, from a mobile computing device, a request for content, wherein the request includes an original version of session information identifying a user of the mobile computing device;
   transmit an encrypted version, but not the original version, of the session information to a content server;
   receive, based at least in part on the encrypted version of the session information, the requested content from the content server; and
   transmit the received content to the mobile computing device.

2. The hardware portal of claim 1, wherein the request further includes an embedded link, wherein the embedded link includes navigational information for retrieving the requested content.

3. The hardware portal of claim 1, wherein the content server is operable to receive the requested content from a remote content source.

4. The hardware portal of claim 1, wherein the received content is encrypted, and wherein the instructions further cause the hardware portal to decrypt the received content before transmitting the received content to the mobile computing device.

5. The hardware portal of claim 1, wherein the content includes content which is refreshed and downloaded to the mobile computing device.

6. The hardware portal of claim 1, wherein the instructions further cause the hardware portal to transmit the encrypted version of the session information to the mobile computing device.

7. The hardware portal of claim 6, wherein the instructions further cause the hardware portal to retrieve an embedded link prior to transmitting the encrypted version of the session information to the mobile computing device.

8. The hardware portal of claim 7, wherein the instructions further cause the hardware portal to transmit the embedded link to the mobile computing device.

9. The hardware portal of claim 6, wherein the instructions further cause the hardware portal to encrypt the received content prior to transmitting the received content to the mobile computing device.

10. The hardware portal of claim 9, wherein the requested content is encrypted using ECC (elliptic curve cryptography).

11. The hardware portal of claim 1, wherein the instructions further cause the hardware portal to connect to an encryption device to establish a secure connection to the content server using a negotiated encryption key.

12. A method, comprising:
receiving, by a content server, a request for content, wherein the request includes an encrypted version, but not an original version, of session information, the original version of session information usable by a hardware portal to identify a user of a mobile computing device; and
sending, by the content server, the requested content to the mobile computing device via the hardware portal.

13. The method of claim 12, wherein the original version, but not the encrypted version, of the session information is stored by the hardware portal.

14. The method of claim 12, further comprising:
encrypting the requested content, using the encrypted version of session information.

15. The method of claim 12, further comprising:
receiving, by the content server, user information including a user account number corresponding to an account for a content provider, wherein the user information is usable by the content server to access the requested content.

16. The method of claim 12, further comprising:
participating in a security key exchange with the hardware portal.

17. The method of claim 12, further comprising:
sending an encrypted session cookie, via the hardware portal, to the mobile computing device, wherein the encrypted session cookie is usable by the mobile computing device to establish a secure session with the content server.

18. The method of claim 17, wherein the encrypted session cookie is based at least in part on a received user ID and a received user password, wherein the user ID and password correspond to a user account.

19. A non-transitory computer-readable medium having program instructions stored thereon, wherein the program instructions are executable by a hardware portal to cause the hardware portal to perform operations comprising:
receiving, from a mobile computing device, a request for content at a content server, wherein the request includes an original version of session information associated with a user of the mobile computing device;
transmitting an encrypted version, but not the original version, of the session information to the content server;
receiving the content from the content server; and
transmitting, based at least in part on the original version of the session information, the received content to the mobile computing device.

20. The non-transitory computer-readable medium of claim 19, wherein the transmitting includes:
receiving, from the mobile computing device, a password; and
comparing the password to the original version of the session information, wherein the original version, but not the encrypted version, of the session information is stored by the hardware portal.

* * * * *